United States Patent
Fukao et al.

(10) Patent No.: US 10,131,405 B2
(45) Date of Patent: Nov. 20, 2018

(54) BICYCLE CONTROL DEVICE FOR OPERATING A BICYCLE COMPONENT

(71) Applicant: Shimano Inc., Sakai, Osaka (JP)

(72) Inventors: Kazutaka Fukao, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 210 days.

(21) Appl. No.: 14/684,677

(22) Filed: Apr. 13, 2015

(65) Prior Publication Data

US 2016/0297501 A1    Oct. 13, 2016

(51) Int. Cl.
   *B62M 25/04*    (2006.01)
   *B62K 25/04*    (2006.01)
   *B62J 1/08*    (2006.01)

(52) U.S. Cl.
   CPC ............... *B62M 25/04* (2013.01); *B62J 1/08* (2013.01); *B62K 25/04* (2013.01); *B62J 2001/085* (2013.01); *B62K 2025/044* (2013.01); *B62K 2025/045* (2013.01)

(58) Field of Classification Search
   CPC ...... B62M 25/04; B62J 1/08; B62J 2001/085; B62K 25/04; B62K 2025/045
   See application file for complete search history.

(56) References Cited

U.S. PATENT DOCUMENTS

| 3,181,391 | A | * | 5/1965 | Juy | ........... | B62K 23/06 |
| | | | | | | 403/162 |
| 5,186,072 | A | | 2/1993 | Nagano | | |
| 5,222,412 | A | | 6/1993 | Nagano | | |
| 5,287,766 | A | | 2/1994 | Nagano | | |
| 5,325,735 | A | | 7/1994 | Nagano | | |
| 5,682,794 | A | * | 11/1997 | Shibata | ........... | B62K 23/06 |
| | | | | | | 74/142 |
| 6,502,477 | B1 | * | 1/2003 | Assel | ........... | B62K 23/06 |
| | | | | | | 74/502.2 |
| 8,065,932 | B2 | * | 11/2011 | Hara | ........... | B62K 23/06 |
| | | | | | | 74/502.2 |
| 2005/0241430 | A1 | * | 11/2005 | Kawakami | ........... | B62K 23/06 |
| | | | | | | 74/502.2 |

(Continued)

FOREIGN PATENT DOCUMENTS

EP    2 075 187 A    7/2009

*Primary Examiner* — Vicky A Johnson
(74) *Attorney, Agent, or Firm* — Global IP Counselors, LLP

(57) ABSTRACT

A bicycle control device is provided for operating a bicycle component. The bicycle control device includes a base member, an operating member, a take-up member and a pulling member. The operating member moves relative to the base member in opposite directions from a rest position to first and second operated positions. The take-up member moves relative to the base member in a take-up direction for pulling a control cable and a releasing direction for releasing the control cable. The pulling member is disposed on the operating member to move the take-up member in the take-up direction in response to an operation of the operating member toward the first operated position. The take-up member moves in the releasing direction in response to an operation of the operating member toward the second operated position. The pulling member contacts the take-up member while the operating member is in the rest position.

24 Claims, 21 Drawing Sheets

(56) References Cited

U.S. PATENT DOCUMENTS

2007/0068316 A1\* 3/2007 Kawakami ............. B62K 23/06
  74/502.2
2009/0158881 A1\* 6/2009 Shahana ................ B62K 23/06
  74/502
2009/0308194 A1 12/2009 Shahana \* cited by examiner

BICYCLE CONTROL DEVICE FOR OPERATING A BICYCLE COMPONENT

BACKGROUND

Field of the Invention

This invention generally relates to a bicycle control device. More specifically, the present invention relates to a bicycle control device having at least one a take-up member for operating at least one bicycle component.

Background Information

Bicycles are often provided with one or more bicycle control devices for controlling various components of the bicycle. Typically, a bicycle control cable interconnects the bicycle control device to a cable operated bicycle component of the bicycle. Most conventional bicycle control cables have, for example, a tubular outer case and an inner wire that can be inserted into and passed through the outer case. The inner wire protrudes beyond both ends of the outer case and each end of the inner wire is connected to either the bicycle control device or the bicycle component. This type of bicycle control cable is often called a Bowden type of bicycle control cable. With this type of bicycle control cable, the bicycle control device pulls and releases the inner wire of the bicycle control cable to change an operating position or state of the bicycle component.

SUMMARY

Generally, the present disclosure is directed to various features of a bicycle control device for operating at least one bicycle component.

In view of the state of the known technology and in accordance with a first aspect of the present disclosure, a bicycle control device is basically provided for operating a bicycle component. The bicycle control device basically includes abuse member, an operating member, a take-up member and a pulling member. The base member is configured to be mounted to a bicycle. The operating member is movably disposed with respect to the base member from a rest position to a first operated position and a second operated position that is opposite to the first operated position with respect to the rest position. The take-up member is movably disposed with respect to the base member in a take-up direction for pulling a control cable and a releasing direction that is opposite to the take-up direction for releasing the control cable. The pulling member is disposed on the operating member to move the take-up member in the take-up direction in response to an operation of the operating member toward the first operated position. The take-up member is configured to move in the releasing direction in response to an operation of the operating member toward the second operated position. The pulling member contacts the take-up member while the operating member is in the rest position.

In accordance with a second aspect of the present invention, the bicycle control device according to the first aspect is configured so that the operating member is configured to move the pulling member away from the take-up member in response to the operation of the operating member toward the second operated position.

In accordance with a third aspect of the present invention, the bicycle control device according to the second aspect is configured so that the pulling member is pivotally disposed on the operating member about a first rotational axis.

In accordance with a fourth aspect of the present invention, the bicycle control device according to the first aspect is configured so that the take-up member is configured to rotate about a second rotational axis, and the operating member is configured to rotate about the second rotational axis as the operating member moves from the rest position toward the first operated position.

In accordance with a fifth aspect of the present invention, the bicycle control device according to the fourth aspect is configured so that the operating member is configured to rotate about a third rotational axis as the operating member moves from the rest position toward the second operated position. The third rotational axis is different from the second rotational axis.

In accordance with a sixth aspect of the present invention, the bicycle control device according to the fifth aspect is configured so that the pulling member is pivotally disposed on the operating member about a first rotational axis.

In accordance with a seventh aspect of the present invention, the bicycle control device according to the sixth aspect is configured so that the first rotational axis is different from the second and third rotational axes.

In accordance with an eighth aspect of the present invention, the bicycle control device according to the seventh aspect is configured so that the first rotational axis rotates about the third rotational axis in response to the operation of the operating member toward the second operated position.

In accordance with a ninth aspect of the present invention, the bicycle control device according to the fifth aspect is configured so that the operating member includes an elongated slot through which the third rotational axis passes.

In accordance with a tenth aspect of the present invention, the bicycle control device according to the ninth aspect is configured so that the third rotational axis relatively moves along the elongated slot while the operating member is operated from the rest position toward the first operated position.

In accordance with an eleventh aspect of the present invention, the bicycle control device according to the fifth aspect is configured so that the operating member includes a first part rotatably disposed with respect to the base member about the second rotational axis and a second part rotatably disposed with respect to the base member about the third rotational axis.

In accordance with a twelfth aspect of the present invention, the bicycle control device according to the eleventh aspect is configured so that the first part and the second part rotate together about the second rotational axis in response to the operation of the operating member toward the first operated position.

In accordance with a thirteenth aspect of the present invention, the bicycle control device according to the twelfth aspect is configured so that the first part rotates about the second rotational axis and the second part rotates about the third rotational axis in response to the operation of the operating member toward the second operated position.

in accordance with a fourteenth aspect of the present invention, the bicycle control device according to the eleventh aspect is configured so that the second part includes a first axle pivotally supporting the pulling member on the second part about the first rotational axis.

In accordance with a fifteenth aspect of the present invention, the bicycle control device according to the first aspect further comprises a position maintaining member movably disposed with respect to the base member to move between a holding position that holds the take-up member in one of a plurality of predetermined positions and a releasing position that releases the take-up member for rotational movement.

In accordance with a sixteenth aspect of the present invention, the bicycle control device according to the fifteenth aspect further comprises a releasing member configured to move the position maintaining member to the releasing position in response to the operation of the operating member toward the second operated position.

In accordance with a seventeenth aspect of the present invention, the bicycle control device according to the sixteenth aspect is configured so that the position maintaining member is pivotally disposed relative to the base member about a fourth rotational axis.

In accordance with an eighteenth aspect of the present invention, a bicycle control device is basically provided for operating a bicycle component. The bicycle control device basically includes a base member, an operating member, a take-up member and a pulling member. The base member is configured to be mounted to a bicycle. The operating member is movably disposed with respect to the base member from a rest position to a first operated position and a second operated position that is opposite to the first operated position with respect to the rest position. The take-up member is movably disposed with respect to the base member in a take-up direction for pulling a control cable and a releasing direction that is opposite to the take-up direction for releasing the control cable. The pulling member is disposed on the operating member to move the take-up member in the take-up direction in response to an operation of the operating member toward the first operated position. The pulling member contacts the take-up member while the operating member is in the rest position. The operating member is configured to move the pulling member away from the take-up member in response to the operation of the operating member toward the second operated position.

In accordance with a nineteenth aspect of the present invention, a bicycle control device is provided that basically includes a base member, a first actuation unit and a second actuation unit. The base member is configured to be mounted to a bicycle. The first actuation unit includes a first take-up member, a first position maintaining member and a first operating member. The first take-up member is movably disposed on the base member for pulling and releasing a first control cable coupled to a first bicycle component. The first position maintaining member is movably disposed with respect to the mounting member to selectively maintain the first take-up member in one of a plurality of predetermined positions. The first operating member is movably disposed with respect to the base member to change a current position of the first take-up member for pulling and releasing the first control cable. The second actuation unit includes a second take-up member, a second position maintaining member and a second operating member. The second take-up member is movably disposed on the base member for pulling and releasing a second control cable coupled to a second bicycle component. The second position maintaining member is movably disposed with respect to the base member to selectively maintain the second take-up member in one of a plurality of predetermined positions. The second operating member is movably disposed with respect to the base member to change a current position of the second take-up member for pulling and releasing the second control cable.

In accordance with a twentieth aspect of the present invention, the bicycle control device according to the nineteenth aspect is configured so that the base member includes a housing. The first take-up member and the second take-up member are disposed in the housing.

In accordance with a twenty-first aspect of the present invention, the bicycle control device according to the nineteenth aspect is configured on that the first take-up member and the second take-up member are configured to coaxially rotatable with respect to the base member about a rotational axis.

In accordance with a twenty-second aspect of the present invention, the bicycle control device according to the nineteenth is configured so that the second operating member is movable with respect to the base member in a first operating direction such that the second take-up member pulls the second control cable and movable with respect to the base member in a second operating direction that is different from the first operating direction such that the second take-up member releases the second control cable.

In accordance with a twenty-third aspect of the present invention, the bicycle control device according to the twenty-second aspect is configured so that the first operating member is movable with respect to the base member in a third operating direction such that the first take-up member selectively pulls and releases the first control cable.

In accordance with a twenty-fourth aspect of the present invention, the bicycle control device according to the nineteenth aspect is configured so that the second take-up member has more than or equal to three predetermined positions and the first take-up member has only two predetermined positions.

In accordance with a twenty-fifth aspect of the present invention, the bicycle control device according to the nineteenth aspect is configured so that the second bicycle component is one of a bicycle suspension and a height adjustable seatpost, and the first bicycle component is a bicycle gear transmission.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
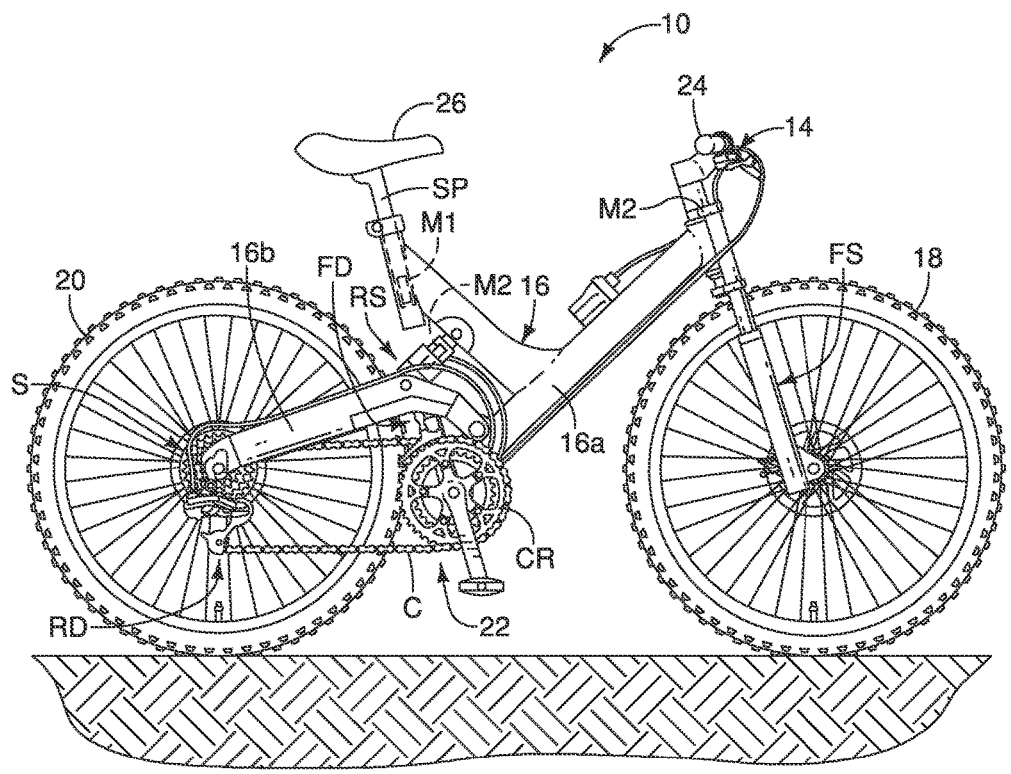
FIG. 1 is a side elevational view of a bicycle that is equipped with a pair of bicycle control devices in accordance with one illustrated embodiment.
Figure 2:
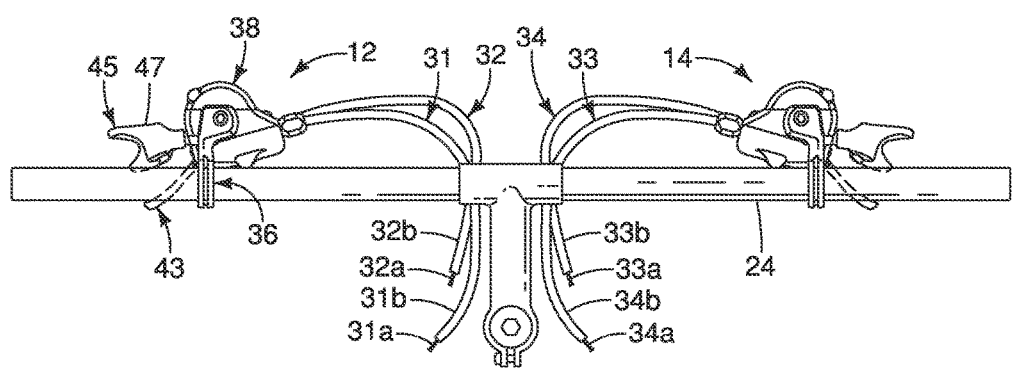
FIG. 2 is an enlarged top view of a handlebar area of the bicycle illustrated in FIG. 1 with the bicycle control devices mounted to the handlebar of the bicycle.

Referring initially to FIGS. 1 and 2, a bicycle 10 is illustrated that is equipped with a pair of bicycle control devices 12 and 14 in accordance with a first embodiment. Each of the bicycle control devices 12 and 14 is basically provided for operating a bicycle component. As explain later, in the illustrated embodiment, each of the bicycle control devices 12 and 14 is configured to operate two bicycle components. The bicycle 10 is, for example, a mountain bike. The bicycle 10 has a bicycle frame 16 to which a front wheel 18, a rear wheel 20 and a drivetrain 22 are mounted. The frame 16 comprises a frame main body 16a and a swing arm 16b. The swing arm 16b is coupled to a rear section of the frame main body 16a such that the swing arm 16b can pivot freely. A front suspension fork FS is pivotally mounted to a head tube of the frame main body 16a. A handlebar 24 is mounted to an upper end of a steerer tube of the front suspension fork FS. The front wheel 18 is mounted to the lower end of the front suspension fork FS. The rear wheel 20 is mounted to a rear end of the swing arm 16b. A rear suspension RS is provided between the frame main body 16a and the swing arm 16b. A height adjustable seatpost SP is attached to a seat tube of the frame main body 16a. Also, a bicycle seat 26 is mounted on top of the seatpost SP in any suitable manner. The drivetrain 22 includes a front derailleur FD for selectively shifting a chain C between front chainrings CR, and a rear derailleur RD for selectively shifting the chain C between rear sprockets S.

As seen in FIG. 2, the bicycle control devices 12 and 14 are mounted on opposite ends of the handlebar 24. The bicycle control device 12 is basically provided for operating a first bicycle component and a second bicycle component. Likewise, the bicycle control device 14 is provided for operating a first bicycle component and a second bicycle component. The first bicycle component is a bicycle gear transmission (e.g., the front derailleur ED or the rear derailleur RD in the illustrated embodiment), and the second bicycle component is one of a bicycle suspension and a height adjustable seatpost. For example, in the illustrated embodiment, the bicycle control device 12 is configured to operate the front derailleur FD as a first bicycle component and the front suspension fork FS as a second bicycle component. Likewise, for example, in the illustrated embodiment, the bicycle control device 14 is configured to operate the rear derailleur RD as a first bicycle component and to operate the rear suspension RS as a second bicycle component. Further, a combination of the first bicycle component and the second bicycle component can be chosen from any kind of bicycle components such as the front derailleur FD, the rear derailleur RD, the seatpost SP, the front suspension fork FS and so on. However, the bicycle control devices 12 and 14 do not need to be configured to operate two bicycle components. For example, in accordance with certain aspects of the present invention, the bicycle control device 12 can be provided for operating a single bicycle component such as one of a bicycle suspension, a height adjustable seatpost, and a bicycle gear transmission. In other words, the bicycle control device 12 can be configured to achieve certain aspects of the present invention, and not achieve other aspects of the present invention if needed and/or desired.

In the illustrated embodiment, the bicycle control device 12 is operatively coupled to the front derailleur ED via a first control cable 31 and to either the seatpost SP, or one of the front and rear suspensions FS and RS via a second control cable 32. The bicycle control device 14 is operatively coupled to the rear derailleur RD via a third control cable 33 and to either the seatpost SP, or one of the front and rear suspensions FS and RS via a fourth control cable 34. Of course, it will be apparent to those skilled in the bicycle field from this disclosure that the bicycle control devices 12 and 14 can be used to control other combinations of bicycle components. For example, the second control cable 32 can be connect both of the front and rear suspensions FS and RS such that the control device 12 controls the front derailleur FD and both of the front and rear suspensions FS and RS.

The seatpost SP is removably received in a seat tube of the frame main body 16a. The seatpost SP can be any suitable type of adjustable seatpost as understood in the bicycle field. For example, the seatpost SP can be adjustable in height either electrically, hydraulically or a pneumatically. For example, in the illustrated embodiment, the seatpost SP is an hydraulic seatpost having a seatpost actuating mechanism M1, such as an oil chamber, an air chamber and a valve structure to control an oil passageway, or other suitable actuator. The operating state of the seatpost SP can be changed by operating a switch, a valve or a controller of the actuator of the seatpost SP using the second control cable 32. The operating state of a seatpost is also called a "positioning state" of the seatpost.

Preferably, the front and rear suspensions FS and RS are configured such that they can assume one of three operating states: a locked state (no damping), a first free state with an intermediate degree of damping and a second free state with a high degree of damping. In the free state, the suspension can expand and contract. The term "a locked state" in which a suspension cannot expand and contract, as used herein, encompasses a state in which a suspension is prohibited from expanding and contracting but still may expand and contract in a limited situation e.g. by a separate blow-off structure as well as a state in which a suspension is completely prohibited from expanding and contracting. The free state is also called a "lock-released state." The operating state of a suspension is also called a "setting state" of the suspension. The front suspension FS and the rear suspension RS are configured such that the operating states thereof can be controlled using mechanical control cables. Each of the front suspension FS and the rear suspension RS includes a suspension adjustment mechanism M2 such as an oil chamber, an air chamber and a valve structure to control an oil passageway, or other suitable actuator. The operating state of the front suspension FS or the rear suspension RS can be changed by operating the actuator of the front suspension FS or the rear suspension RS to control a valve provided inside the front suspension FS or the rear suspension RS.

Preferably, the control cables 31 to 34 are conventional bicycle control cables that have an outer casing covering an inner wire. In other words, each of the shift control cables 31 to 34 is a Bowden type cable that basically includes an inner wire slidably received within an outer casing. For example, as seen in FIG. 2, the first control cable 31 has an inner wire 31a with an outer casing 31b covering the inner wire 31a. The second control cable 32 has an inner wire 32a with an outer casing 32b covering the inner wire 32a. The third control cable 33 has an inner wire 33a with an outer casing 33b covering the inner wire 33a. The fourth control cable 34 has an inner wire 34a with an outer casing 34b covering the inner wire 34a.

Also in the illustrated embodiment, the bicycle control devices 12 and 14 are essentially identical in operation, except that they are mirror images of each other, and they may have a different number of shift operations. In other words, the bicycle control device 12 is identical to the bicycle control device 14, except tier the bicycle control device 14 has been modified to be a mirror image and the number of gears that can be shifted has been changed to accommodate the number of the rear sprockets S. Thus, for the sake of brevity, only the bicycle control device 12 will be discussed and illustrated herein.

Figure 3:
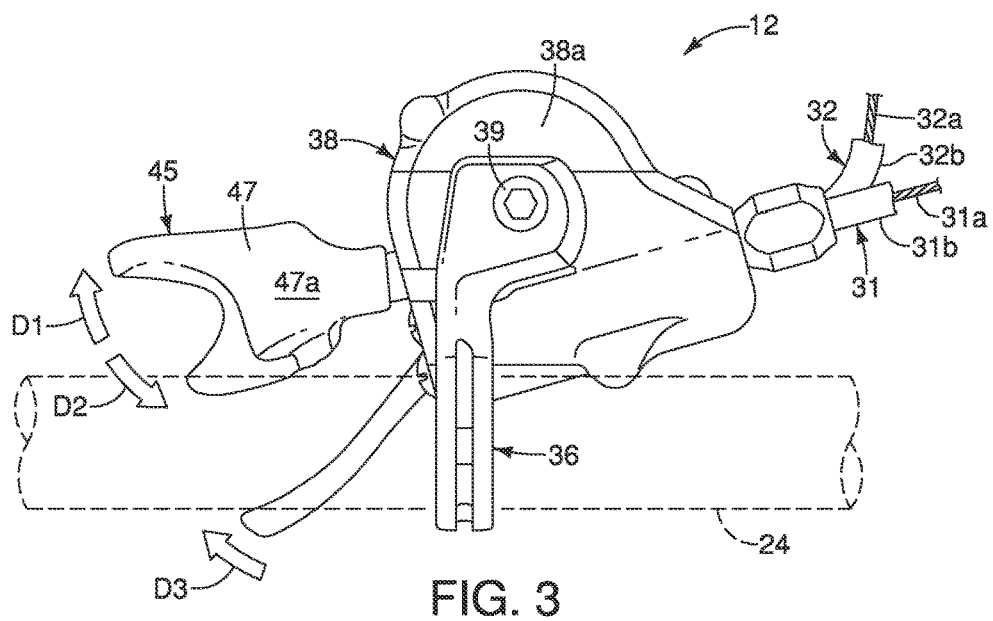
FIG. 3 is a further enlarged top view of the left bicycle control device mounted to the left end of the handlebar of the bicycle.
Figure 4:
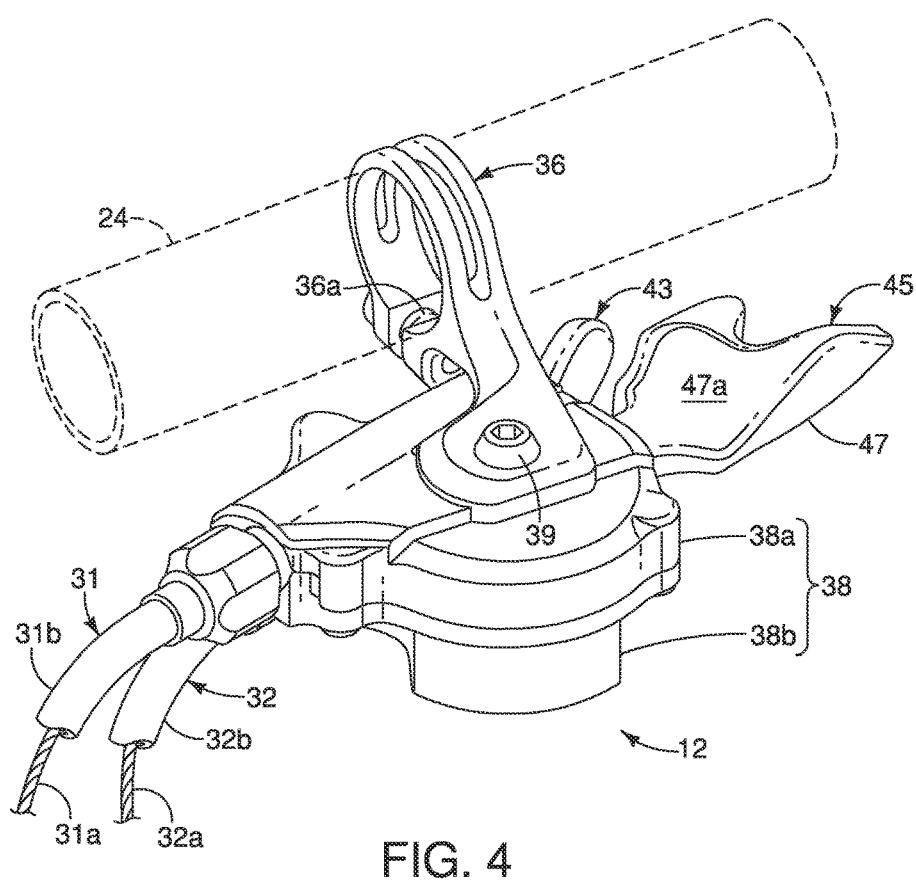
FIG. 4 is a perspective view of the left bicycle control device that is mounted to the left end of the handlebar of the bicycle.

As seen in FIGS. 3 and 4, the bicycle control device 12 comprises a base member including a mounting member 36 and a housing 38. The mounting member 36 is configured to be mounted to the bicycle 10. In particular, the mounting member 36 is configured to be mounted to the handlebar 24 of the bicycle 10. Thus, the mounting member 36 constitutes an example of a handlebar mounting member. Here, the mounting member 36 includes a tightening bolt 36a or other tightening member to form a tube clamp that is configured to squeeze the mounting member 36 onto the handlebar 26.

Figure 5:
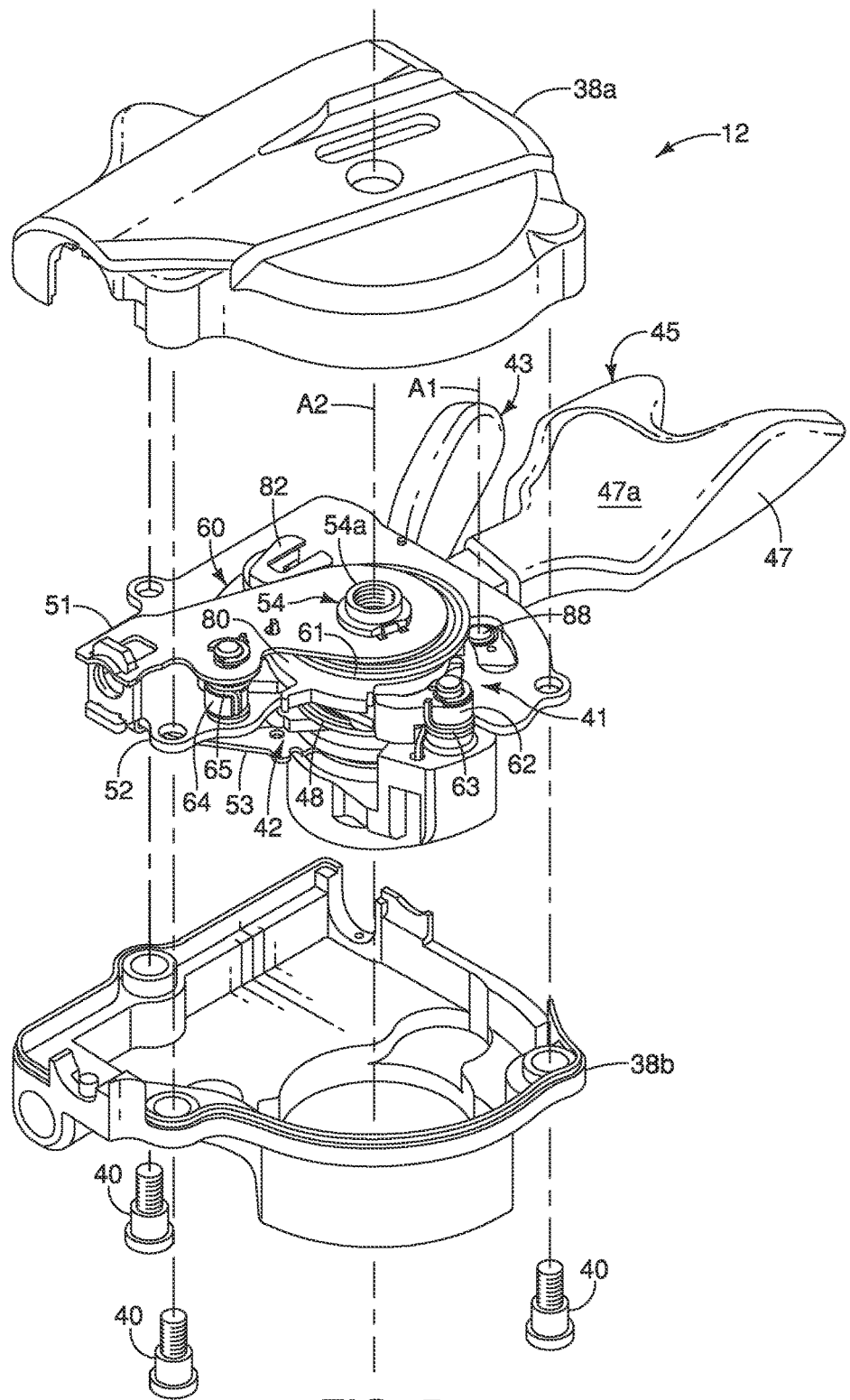
FIG. 5 is a partial exploded perspective view of the bicycle control device illustrated in FIGS. 3 and 4.

As seen in FIGS. 4 and 5, the base member includes the housing 38. The mounting member 36 is fixed to the housing 38 by a screw 39. The housing 38 covers the internal parts of the bicycle control device 12. The housing 38 also supports the internal parts of the bicycle control device 12 on the mounting member 36. Here, the housing 38 has a two-piece construction having a first housing part 38a and a second housing part 38b. The first housing part 38a and the second housing part 38b are fastened together by three screws 40. However, the housing 38 is not limited to the illustrated configuration. Rather, the housing 38 can have a variety of configurations as needed and/or desired.

Referring to FIGS. 5 to 9, in the illustrated embodiment, the bicycle control device 12 further comprises a first actuation unit 41 and a second actuation unit 42. The first and second actuation units 41 and 42 are supported by the housing 38. In the illustrated embodiment, the first actuation unit 41 is configured to be connected to the front derailleur FD as the first bicycle component, and the second actuation unit 42 is configured to be connected to one of the seatpost actuating mechanism M1 and the suspension adjustment mechanism M2 as the second bicycle component. Alternatively, the first actuation unit 41 can be omitted if only the features of the second actuation unit 42 are needed and/or desired.

In FIGS. 5, 6, 11, 12, 18, 9, 24 and 25, the parts of the first and second actuation units 41 and 42 are shown in their rest positions. The term "rest position" as used herein refers to a state in which a movable part remains stationary without the need of a user intervening (e.g., holding the movable part) in the state corresponding to the rest position. Thus, the term "rest position" can also be referred to as a non-operated position. The term "end position" as used herein refers a state in which a movable part is prevent from be moved further from the rest position in a movement direction of a movement stroke of that movable part. The term "operated position" as used herein refers to a state in which a movable part is moved from the rest position to a position as a result of an external force being applied to the movable part. As will become apparent from this disclosure, certain parts of the first and second actuation units 41 and 42 can have more than one rest position.

Basically, the first actuation unit 41 of the bicycle control device 12 includes a first operating member 43 for operating a first bicycle component in response to movement of the first operating member 43 from a rest position to an operated position. In the illustrated embodiment, the first operating member 43 is pivotally mounted lever that pivots relative to the housing 38 between the rest (non-operated) position and the operated position. The first operating member 43 is operated in only one operating direction for performing both the releasing and pulling operations of the first actuation unit 41 as explained later in more detail. The first actuation unit 41 further includes a biasing member 44 (e.g., a torsion spring) that is arranged for biasing the first operating member 43 towards the rest position. Basically, the biasing member 44 is operatively coupled between the first operating member 43 and a stationary part of the bicycle control device 12 for biasing the first operating member 43 towards the rest position of the first operating member 43. In this way, the first operating member 43 is a trigger lever that returns to the rest position after being pivoted from the rest position to an operated position and then released.

Basically, the second actuation unit 42 of the bicycle control device 12 includes a second operating member 45 for operating a second bicycle component in response to movement of the second operating member 45. Here, the second operating member 45 includes a first part 46 and a second part 47. The second operating member 45 is operated in different operating directions for performing the releasing and pulling operations of the second actuation unit 42 as explained later. The second actuation unit 42 further includes a biasing member 48 (e.g., a torsion spring) that is arranged for biasing the second operating member 45 towards the rest position. Here, the second operating member 45 can be operated in two different directions from the rest position as explained later.

Here in the illustrated embodiment, as seen in FIGS. 6 to 9, the bicycle control device 12 further comprises an internal support structure that includes a first (top) stationary support plate 51, a second (middle) stationary support plate 52, a third (bottom) stationary support plate 53 and a main support axle 54. The stationary support plates 51 to 53 and the main support axle 54 support the various parts of the first and second actuation units 41 and 42 within the housing 38. The main support axle 54 extends through the stationary support plates 51, 52 and 53. In the illustrated embodiment, the main support axle 54 is formed by a bolt 54a and a nut 54b that is screwed onto one threaded end of the bolt 54a for fixing various parts of the first and second actuation units 41 and 42 on the stationary support plates 51, 52 and 53. The main support axle 54 is provided with various washers and bushings to aid in supporting and smooth movement of the first and second actuation units 41 and 42. Since the washers and bushings are conventional structures that are commonly used in bicycle control device to aid in supporting and smooth movement of the parts, the washers and bushings will not be discussed and/or illustrated for the sake of brevity. A pivot axle 55 is mounted to the third (bottom) stationary support plate 53.

The first operating member 43 is pivotally mounted on the main support axle 54 to operate the first actuation unit 41 by selectively pulling and releasing the inner wire 31a of the first control cable 31. The second operating member 45 is pivotally mounted on the main support axle 54 to operate the second actuation unit 42 by pulling the inner wire 32a of the second control cable 32. However, in the case of a releasing operation of the second actuation unit 42, the first part 46 of the second operating member 45 pivots about the main support axle 54 while the second part 47 of the second operating member 45 pivots about the pivot axle 55.

Figure 7:
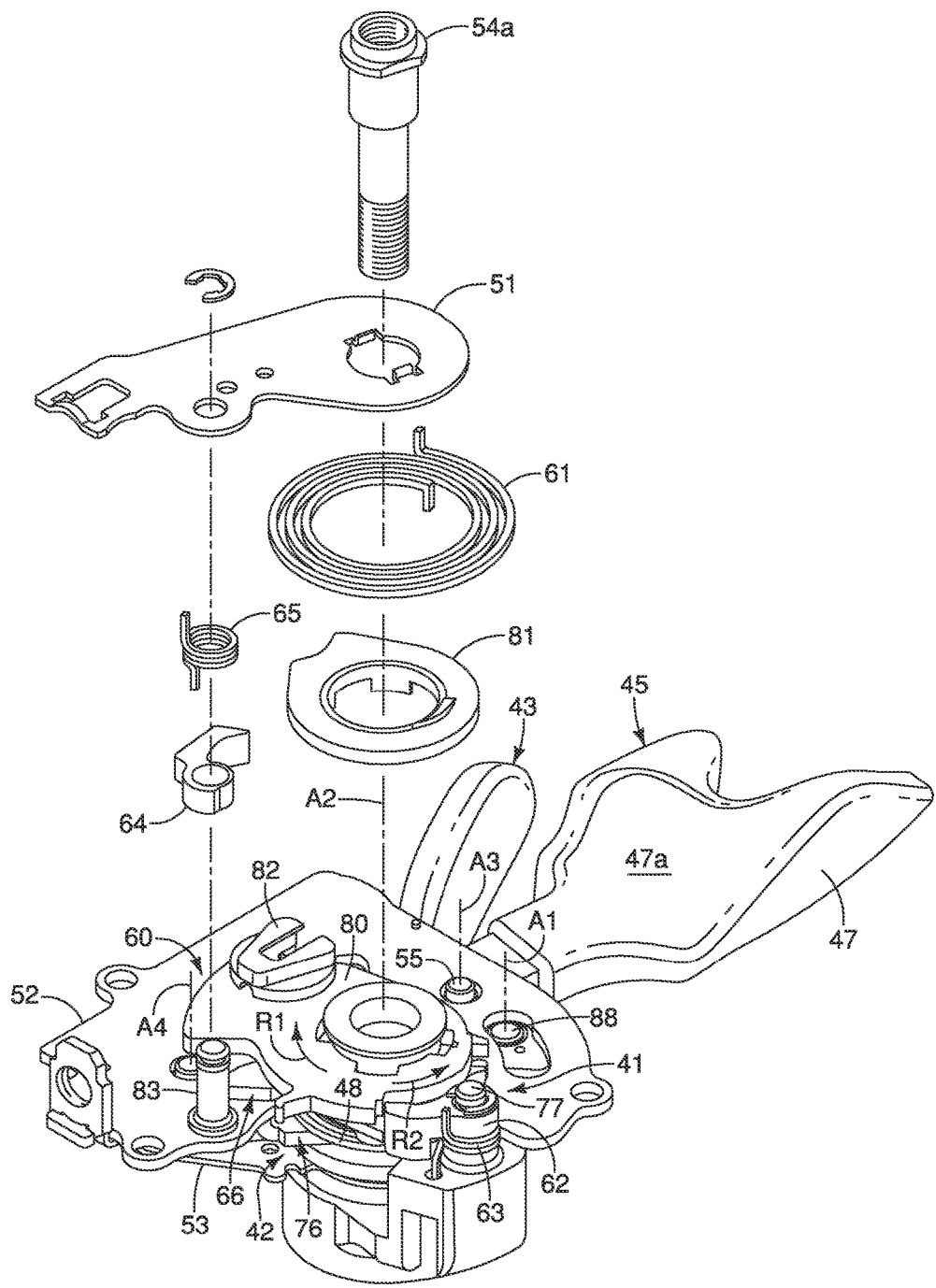
FIG. 7 is a partial exploded perspective view of the internal parts of the bicycle control device illustrated in FIG. 6.
Figure 8:
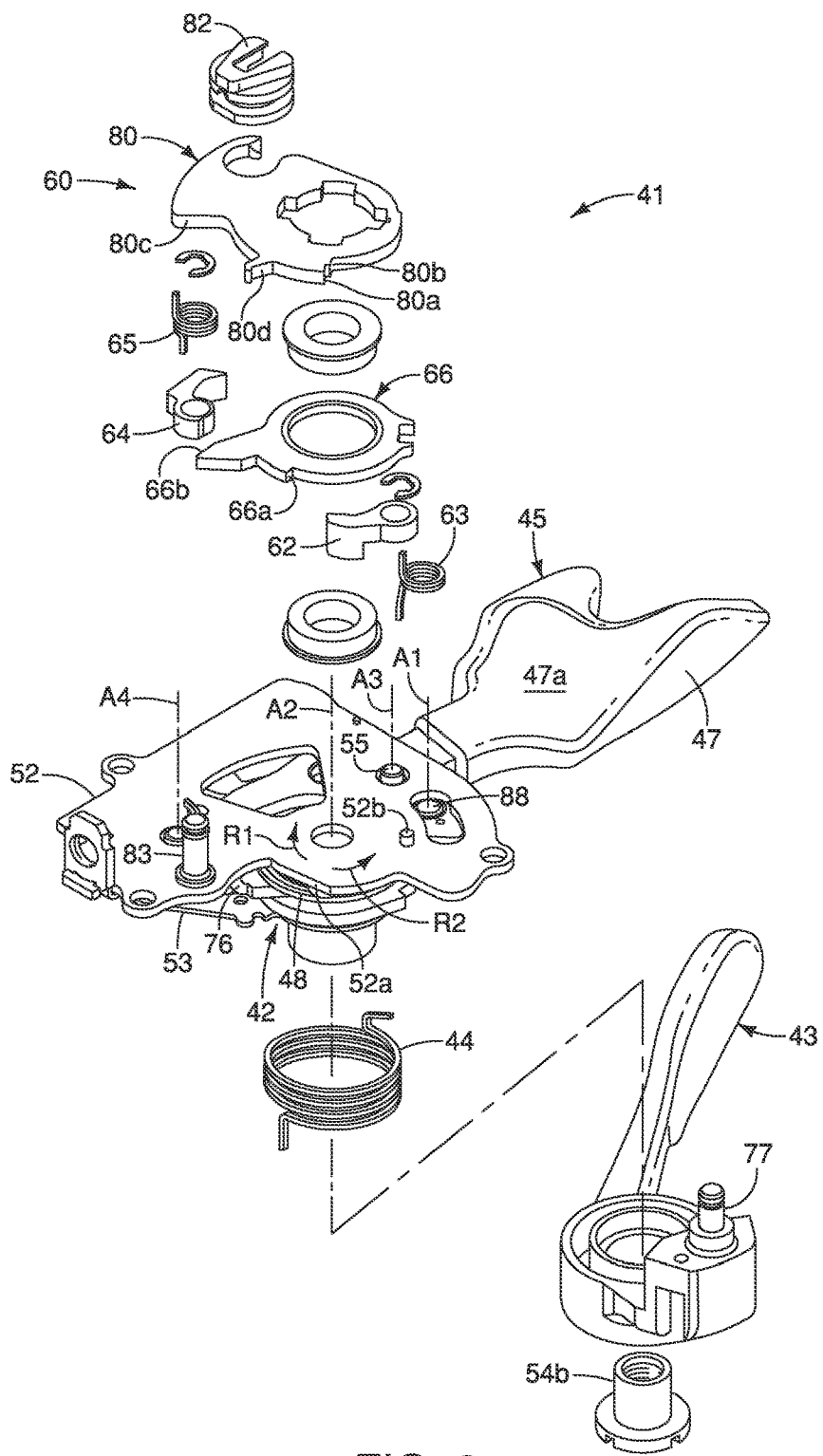
FIG. 8 is a further partial exploded perspective view of the internal parts of the bicycle control device illustrated in FIGS. 6 and 7 with selected parts removed.

In particular, as seen in FIGS. 7 and 8, the first actuation unit 41 of the bicycle control device 12 further includes a first take-up member 60 that is configured to be connected to the first bicycle component via the first control cable 31. The inner wire 31a of the first control cable 31 is pulled or released by movement of the first take-up member 60 as a result of the operation of the first operating member 43. In other words, the first operating member 43 is movably disposed with respect to the base member from the rest position to the operated position. In other words, the first operating member 43 is movably disposed with respect to the base member (the mounting member 36 and the housing 38) to change a current position of the first take-up member 60 for pulling and releasing the inner wire 31a of the first control cable 31. In particular, the first take-up member 60 is rotatably mounted on the main support axle 54. In this way, the first take-up member 60 is movably disposed on the base member for pulling and releasing the inner wire 31a of the first control cable 31 that is coupled to a first bicycle component.

Figure 6:
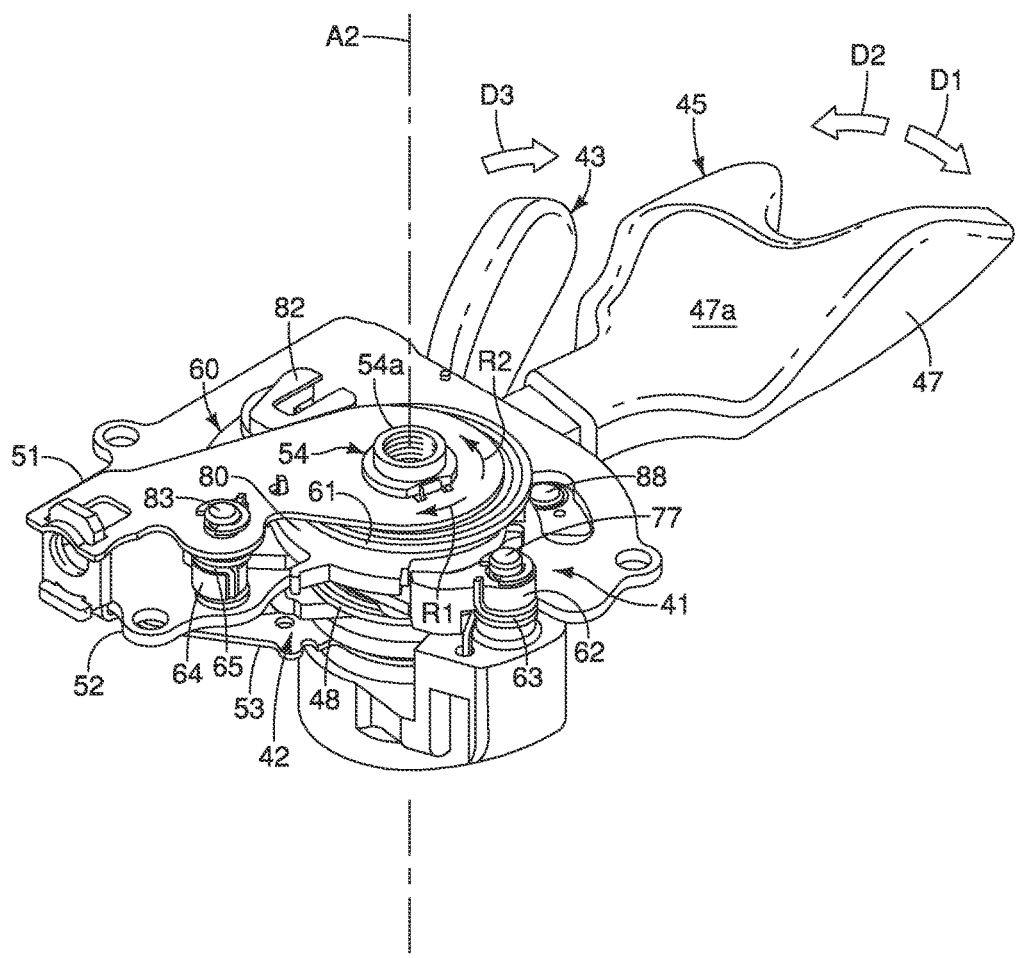
FIG. 6 is an enlarged perspective view of the internal parts of the bicycle control device illustrated in FIGS. 3 and 4.

As seen in FIGS. 6 to 8, in the illustrated embodiment, the first take-up member 60 rotates in a take-up direction R1 for pulling the inner wire 31a of the first control cable 31, and rotates in a releasing direction R2 for releasing the inner wire 31a of the first control cable 31. The releasing direction R2 is opposite to the take-up direction R1. The first take-up member 60 is biased in the releasing direction R2, which is the opposite direction of the take-up direction R1 by a biasing member 61 (e.g., a torsion spring). The first take-up member 60 is disposed in the housing 38.

The first actuation unit 41 of the bicycle control device 12 further includes a first pulling member 62 for rotating the first take-up member 60 in the take-up direction R1 in response to operation of the first operating member 43. The first actuation unit 41 further includes a biasing member 63 (e.g., a torsion spring) that is arranged for biasing the first pulling member 62 to contact the first take-up member 60.

As seen in FIG. 8, the first actuation unit 41 of the bicycle control device 12 further includes a first position maintaining member 64 fur holding the first take-up member 60 in a selected one of a plurality of predetermined positions. In particular, the first position maintaining member 64 is movably disposed with respect to the mounting member 36 to selectively maintain the first take-up member 60 in one of the plurality of predetermined positions. More particularly, the first position maintaining member 64 is movably disposed with respect to the base member to move between a holding position and a releasing position. In the holding position, the first position maintaining member 64 holds the first take-up member 60 in one of the plurality of predetermined positions. In the releasing position, the first position maintaining member 64 releases the first take-up member 60 for rotational movement. The first take-up member 60 has only two predetermined positions. The first actuation unit 411 further includes a biasing member 65 (e.g., a torsion spring) that is arranged for biasing the first position maintaining member 64 to contact the first take-up member 60.

The first actuation unit 41 of the bicycle control device 12 further includes a first releasing member 66 for releasing the first take-up member 60 for rotational movement from the current predetermined position so that the first take-up member 60 can move to the next predetermined position in the releasing direction R2. The first releasing member 66 is configured to move the first position maintaining member 64 to the releasing position in response to the operation of the first operating member 53 toward the operated position. When the first actuation unit 41 is in the rest position, the first position maintaining member 64 is biased against the first releasing member 66 by the biasing member 65 such that the first releasing member 66 is biased in the releasing direction R2.

Figure 9:
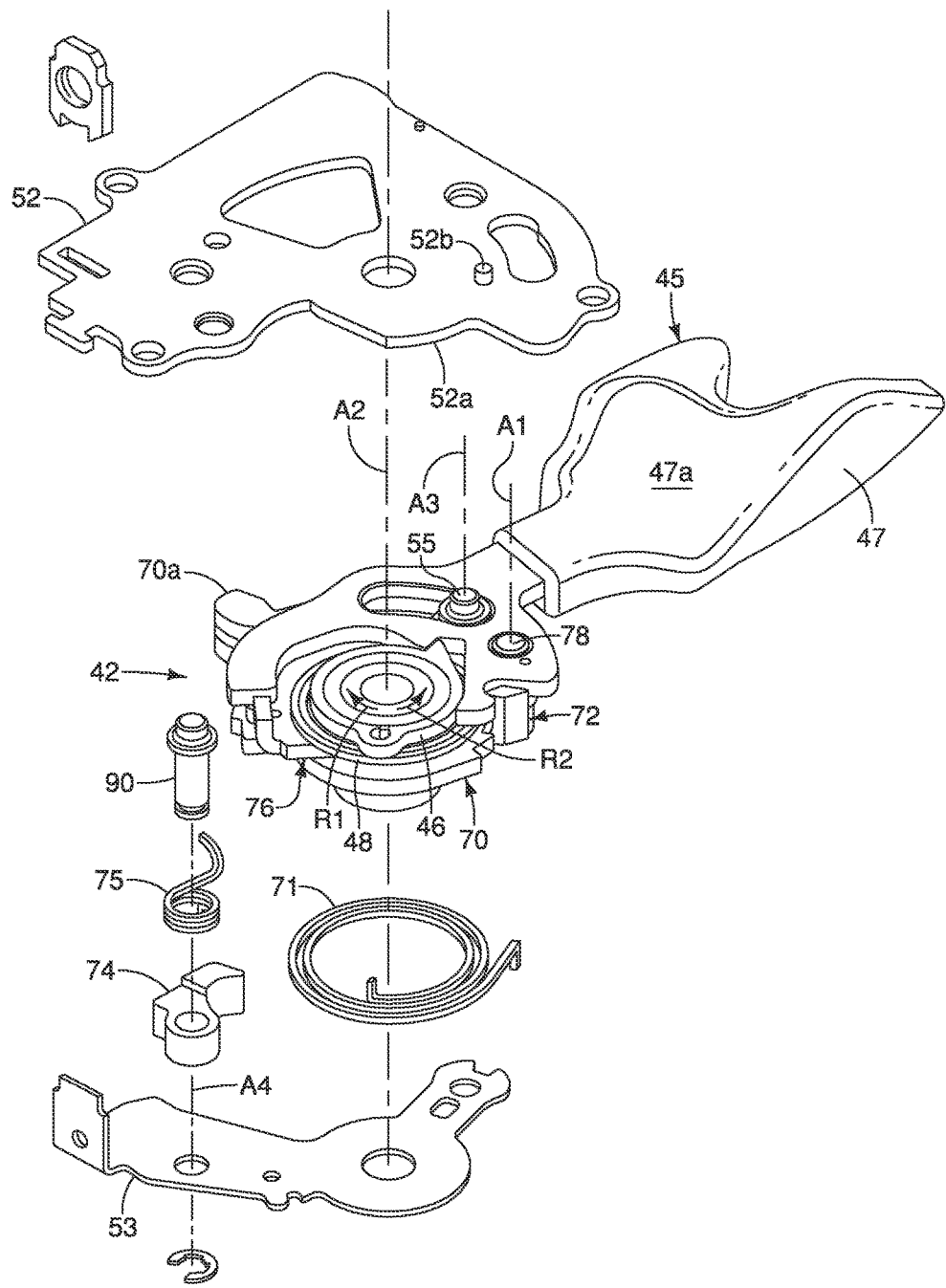
FIG. 9 is yet a further partial exploded perspective view of the internal parts of the bicycle control device illustrated in FIGS. 6 to 8 with selected parts removed.
Figure 10:
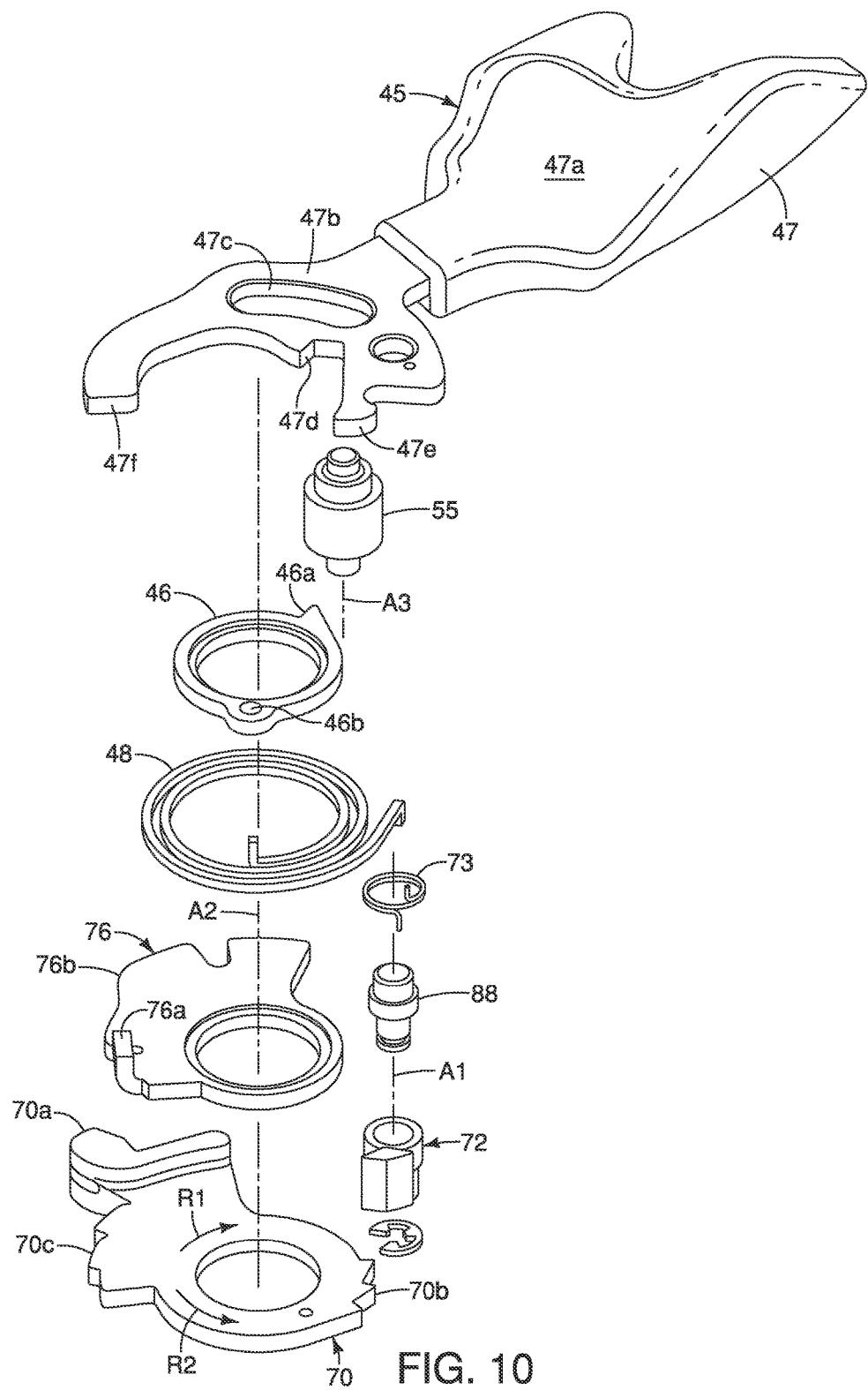
FIG. 10 is a partial exploded perspective view of selected internal parts of the bicycle control device illustrated in FIGS. 6 to 8 with other selected parts removed.

In particular, as seen in FIGS. 9 and 10, the second actuation unit 42 of the bicycle control device 12 includes a second take-up member 70 that is configured to be connected to the second bicycle component via the second control cable 32. The inner wire 32a of the second control cable 32 is pulled or released by the movement of the second take-up member 70 as a result of the operation of the second operating member 45. The second take-up member 70 is biased in the releasing direction R2, which is the opposite direction of the take-up direction R1 by a biasing member 71 (e.g., a torsion spring).

The second take-up member 70 is configured to move in the takeup direction R1 in response to an operation of the second operating member 45 toward a first operated position. The second take-up member 70 is configured to move in the releasing direction R2 in response to an operation of the second operating member 45 toward the second operated position. In other words, the second operating member 45 is movably disposed with respect to the base member to change a current position of the second take-up member 70 for pulling and releasing the inner wire 32a of the second control cable 32. In this way, the second take-up member 70 is movably disposed on the base member (i.e. the mounting member 36 and the housing 38) for pulling and releasing the inner wire 32a of the second control cable 32 that is coupled to a second bicycle component. In particular, the second take-up member 70 is rotatably mounted on the main support axle 54.

As seen in FIG. 9, in the illustrated embodiment, the second take-up member 70 rotates in the take-up direction R1 for pulling the inner wire 32a of the second control cable 32, and rotates in the releasing direction R2 for releasing the inner wire 32a of the second control cable 32. In other words, the second take-up member 70 is movably disposed with respect to the base member in the take-up direction R1 for pulling the inner wire 32a of the second control cable 32 that is coupled to a second bicycle component and movably disposed with respect to the base member in the releasing direction R2 for releasing the inner wire 32a of the second control cable 32. The second take-up member 70 is disposed in the housing 38.

As seen in FIG. 3, the second operating member 45 is movable with respect to the base member (i.e. the mounting member 36 and the housing 38) in a first operating direction D1 such that the second take-up member 70 pulls the inner wire 32a of the second control cable 32. The second operating member 45 is movable with respect to the base member in a second operating direction D2 that is different from the first operating direction such that the second take-up member 70 releases the inner wire 32a of the second control cable 32. In other words, the second operating member 45 is movably disposed with respect to the mounting member 36 from a rest position to the first operated position and the second operated position. The second operated position is opposite to the first operated position with respect to the rest position. However, the second operated position may not be opposite to the first operated position with respect to the rest position, if the second operating direction from the rest position to the second operated position is different from the first operating direction from the rest position to the first operated position. In contrast, the first operating member 43 is movable with respect to the base member in a third operating direction D3 such that the first take-up member 60 selectively pulls and releases the inner wire 31a of the first control cable 31. In the illustrated embodiment, the third operating direction D3 is substantially same rotational direction about the second rotational axis A2 (described later) as the first operating direction D1.

As seen in FIGS. 9 and 10, the second actuation unit 42 of the bicycle control device 12 further includes a second pulling member 72 for rotating the second take-up member 70 in the take-up direction R1. The second pulling member 72 is pivotally disposed on the second operating member 45 about a first rotational axis A1. The second pulling member 72 contacts the second take-up member 70 while the second operating member 45 is in the rest position. The second pulling member 72 is disposed on the second operating member 45 to move the second take-up member 70 in the take-up direction R1 in response to an operation of the second operating member 45 toward the first operated position. The second actuation unit 42 further includes a biasing member 73 (e.g., a torsion spring) that is arranged for biasing the second pulling member 72 contact the second take-up member 70.

The second operating member 45 is configured to move the second pulling member 72 away from the second take-up member 70 in response to the operation of the second operating member 45 toward the second operated position. In this way, the second pulling member 72 does not interfere with the second take-up member 70 moving in the releasing direction in response to the operation of the second operating member 45 toward the second operated position.

The second actuation unit 42 of the bicycle control device 12 further includes a second position maintaining member 74 for holding the second take-up member 70 in a selected one of a plurality of predetermined positions. In particular, the second position maintaining member 74 is movably disposed with respect to the mounting member 36 to selectively maintain the second take-up member 70 in one of the plurality of predetermined positions. More particularly, the second position maintaining member 74 is movably disposed with respect to the mounting member 36 to move between a holding position and a releasing position. In the holding position, the second position maintaining member 74 holds the second take-up member 70 in one of the plurality of predetermined positions. In the releasing position, the second position maintaining member 74 releases the second take-up member 70 for rotational movement. In the illustrated embodiment, the second position maintaining member 74 engages the second take-up member 70 to selectively establish three predetermined positions. Of course, it will be apparent from this disclosure that the second take-up member 70 can be configured such that the second position maintaining member 74 engages the second take-up member 70 to selectively establish two or more than three predetermined positions. Thus, preferably, the second take-up member 70 has more than or equal to three predetermined positions. The second actuation unit 42 further includes a biasing member 75 (e.g., a torsion spring) that is arranged for biasing the second position maintaining member 74 towards engagement with the second take-up member 70.

The second actuation unit 42 of the bicycle control device 12 further includes a second releasing member 76 for releasing the second take-up member 70 for rotational movement from a selected one of the predetermined positions so that the second take-up member 70 can move to the next predetermined position in the releasing direction R2. The second releasing member 76 is configured to move the second position maintaining member 74 to the releasing position in response to the operation of the second operating member 45 toward the second operated position. When the second actuation unit 42 is in the rest position, the second position maintaining member 74 is biased against the second releasing member 76 by the biasing member 75 such that the second releasing member 76 is biased in the releasing direction R2.

Referring now to FIGS. 7, 8 and 11 to 23, the first actuation unit 41 will now be discussed in greater detail. Basically, as mentioned above, the first actuation unit 41 is operated by moving the first operating member 43 from the rest position to the operated position to rotate the first take-up member 60 using the first pulling member 62. The first take-up member 60 is rotatably mounted to the housing 38 about a second rotational axis A2 that is defined by the main support axle 54. Basically, the first position maintaining member 64 holds or maintains the first take-up member 60 in at least one operated position against a biasing force of the first biasing element 61. On the other hand, the first releasing member 66 basically releases the first take-up member 60 for pivotal movement about the second rotational axis A2 by moving the first position maintaining member 64 out of engagement from the first take-up member 60 against a biasing force of the biasing member 65. Thus, as a result of the operation of the first operating member 43, the first pulling member 62 either rotates the first take-up member 60 to perform a pulling operation, or rotates the first releasing member 66 to perform a releasing operation.

The second (middle) stationary support plate 52 includes a cam surface 52a that is configured to guide the first pulling member 62 in a position in a rotational pass of the first engagement abutment 80a (described below) while the first operating member 43 moves from the operated position to the rest position. The cam surface 52a is defined by a portion of the outer peripheral edge of the second (middle) stationary support plate 52.

Now the first pulling member 62 will be discussed in greater detail. The first pulling member 62 is pivotally mounted on the first operating member 43 and biased towards the first take-up member 60. Specifically, a pivot pin 77 is fixed to the first operating member 43 for pivotally supporting the first pulling member 62 on the first operating member 43. The biasing member 63 has a coiled portion mounted on the pivot pin 77. The biasing member 63 has a first end contacting the first pulling member 62 and a second end contacting the first operating member 43 for biasing the first pulling member 62 towards the first take-up member 60. Thus, the first pulling member 62 moves with respect to the mounting member 36 to selectively move either the first take-up member 60 or the first releasing member 66 depending on position of the first take-up member 60. In both cases, either the first take-up member 60 or the first releasing member 66 is moved in the take-up direction with respect to the base member as the first operating member 43 is moved with respect to base member from the rest position to the operated position.

Specifically, with the first take-up member 60 in the take-up position (FIG. 18), the first releasing member 66 pivots with respect to the base member to move the first position maintaining member 64 from the holding position to the releasing position as the first operating member 43 moves between the rest position and the operated position. As the first releasing member 66 is moved by the first puffing member 62, the first position maintaining member 64 is moved to the releasing position and the first take-up member 60 moves in the releasing direction by a biasing force of the biasing member 61. On the other hand, with the first take-up member 60 in the released position (FIG. 12), the first pulling member 62 does not pivot the first releasing member 66, but rather pivots the first take-up member 60 in the take-up direction R1. In other words, the first pulling member 62 is disengaged from the first releasing member 66 while the first take-up member 60 is in the released position. Also, as the first take-up member 60 is moved by the first pulling member 62 in the take-up direction, the first releasing member 66 remains stationary.

Now, as seen in FIGS. 7 and 8, the first take-up member 60 will be discussed in greater detail. As explained below, the first take-up member 60 pulls and releases the first control cable 31 for operating a first bicycle component (e.g., the front derailleur FD) in response to operation of the first operating member 43. The first take-up member 60 includes a control part 80, a mounting part 81 and a cable attachment part 82. While the control part 80, the cable attachment part 82 and the mounting part 81 are illustrated as separate elements that can be separated and coupled together, it will be apparent from this disclosure that these parts 80, 81 and 82 can be formed a one-piece member, if needed and/or desired. In the illustrated embodiment, the cable attachment part 82 is mounted in an opening of the control part 80. The cable attachment part 82 is located adjacent the outer periphery of the control part 80. The cable attachment part 82 is a conventional part that is configured to receive a nipple that is fixed to the inner wire 31a. The mounting part 81 mates with the control part 80 in a non-pivotally manner, and defines a center opening that receives the main support axle 54. In this way, the control part 80, the cable attachment part 82 and the mounting part 81 pivot together as a unit on the main support axle 54.

In the illustrated embodiment, the control part 80 is a rigid control plate made of a suitable material such as a rigid plastic material or a metallic material. The control part 80 of the first take-up member 60 includes a first engagement abutment 80a, a second engagement abutment 80b, a first positioning abutment 80c and a second positioning abutment 80d. The first and second engagement abutments 80a and 80b are abutment surfaces that are formed by the outer peripheral edge of the control part 80. Likewise, the first and second positioning abutments 80c and 80d are abutment surfaces that are formed by the outer peripheral edge of the control part 80.

The first engagement abutment 80a is provided for pivoting the first take-up member 60 in the take-up direction R1 during a pulling operation as seen in FIGS. 11 to 18. Specifically, the first engagement abutment 80a is configured to be selectively engaged by the first pulling member 62 for pivoting the first take-up member 60 in the take-up direction R1. More specifically, the pawl of the first pulling member 62 contacts the first engagement abutment 80a of the first take-up member 60 during a pulling operation of the first actuation unit 41.

The second engagement abutment 80b is located radially inward of the first engagement abutment 80a. The second engagement abutment 80b is also located radially inward of the cam surface 52a of the second (middle) stationary support plate 52. The second engagement abutment 80b is provided for moving the first pulling member 62 in the releasing direction with a guide of the cam surface 52a, so that the first pulling member 62 is positioned to face the first engagement abutment 80a, after the first take-up member 60 is released from the first position maintaining member 64 and the first operating member 43 is returned to the rest position. Further, the second engagement abutment 80b is configured to be selectively engaged by the first pulling member 62 for stopping the pivoting the first release member 66 in the pulling direction R1. More specifically, the pawl of the first pulling member 62 contacts the second engagement abutment 80b of the first take-up member 60 during a releasing operation of the first actuation unit 41 so that the first take-up member 60 stops at an intermediate position. After the releasing operation, the first pulling member 62 is moved back to its rest position by the second engagement abutment 80b so that the first pulling member 62 faces the first engagement abutment 80a in the rest position. In this embodiment, the first and second engagement abutments 80a and 80b are formed as a one piece unitary member with the control part 80. However, each abutment may be formed at a ratchet wheel which is a separate member from the control part 80 and non-rotatably attached to the control part 80, if needed and/or desired.

The first positioning abutment 80c is configured to engage the first position maintaining member 64 for establishing the released position of the first take-up member 60 in which the first take-up member 60 is fully released. The second positioning abutment 80d is configured to engage the first position maintaining member 64 for establishing the take-up position of the first take-up member 60 in which the first take-up member 60 is fully pulled. The first and second positioning abutments 80c and 80d are defined by two spaced apart portions of the outer peripheral edge of the control part 80. In other words, first and second positioning abutments 80c and 80d protrude from the outer peripheral edge of the control part 80. In this embodiment, the first and second positioning abutments 80c and 80d are formed as a one piece unitary member with the control part 80. However, each abutment may be formed at a ratchet wheel which is a separate member from the control part 80 and non-rotatably attached to the control part 80, if needed and/or desired.

Now, the first position maintaining member 64 will be discussed in greater detail. The first position maintaining member 64 is a pawl that is pivotally mounted between the first and second stationary support plates 51 and 52 by a pivot pin 83. The first position maintaining member 64 has an abutment or pawl that selectively contacts the positioning abutments 80c and 80d of the first take-up member 60. In this way, the first position maintaining member 64 moves with respect to the base member to move between a holding position that holds the first take-up member 60 in one of a plurality of predetermined positions and a releasing position that releases the first take-up member 60 for pivotal movement. With the first take-up member 60 in the released position, the first position maintaining member 64 abuts against the first positioning abutment 80c. With the first take-up member 60 in the take-up position, the first position maintaining member 64 abuts against the second positioning abutment 80d.

The first releasing member 66 moves the first position maintaining member 64 from the holding position to the releasing position as the first operating member 43 is operated from the rest position to the operated position. In other words, as the first operating member 43 is operated from the non-operated position to the operated position, the first releasing member 66 pivots the first position maintaining member 64 from the holding position to the releasing position that is away from the first take-up member 60 to disengage the first position maintaining member 64 from second positioning abutment 80d.

While the first position maintaining member 64 of the first actuation unit 41 only holds the first take-up member 60 in two predetermined positions, it wilt be apparent from this disclosure that the first actuation unit 41 could be configured such that the first position maintaining member 64 holds the first take-up member 60 in more than two predetermined positions as needed and/or desired. However, in the case of certain bicycle components, the first take-up member 60 and the first position maintaining member 64 are configured to establish only two of the predetermined positions as is the case in the illustrated embodiment. In other words, in the illustrated embodiment, the first take-up member 60 and the first position maintaining member 64 are configured to operate a derailleur (e.g., the front derailleur HD) that has only two operating positions. Alternatively, the first take-up member 60 and the first position maintaining member 64 are configured to operate a suspension (e.g., the rear suspension RS) as the bicycle component with only two operating states.

Now, the first releasing member 66 will be discussed in greater detail. In the illustrated embodiment, the first releasing member 66 is a rigid release plate made of a suitable material such as a rigid plastic material or a metallic material. The first releasing member 66 includes an abutment surface 66a and a cam surface 66b.

The abutment surface 66a is configured to be selectively engaged by the first pulling member 62. In particular, the pawl of the first pulling member 62 contacts the abutment surface 66a of the first releasing member 66 during a releasing operation to move the first releasing member 66 in the take-up direction R1. The abutment surface 66a is defined by a portion of the outer peripheral edge of the first releasing member 66. The abutment surface 66a is offset from the first engagement abutment 80a in the take-up direction R1 of the first take-up member 60 while the first take-up member 60 is in the rest position. By this configuration, there is a difference of non-contacting stroke between the pulling operation and the releasing operation of the first actuation unit 41. More specifically, the stroke of the first operating member 43 from the rest position until contact of the first pulling member 62 with the first engagement abutment 80a during the pulling operation is shorter than the stroke of the first operating member 43 from the rest position until contact of the first pulling member 62 with the abutment surface 66a during the releasing operation. Therefore, the rider can notice a difference between the pulling operation and the release operation by the difference of the stroke. The first engagement abutment 80a of the first take-up member 60 is radially and outwardly offset from the abutment surface 66a of the first releasing member 66 with respect to the main support axle 54. Also the abutment surface 66a of the first releasing member 66 is radially and inwardly offset from a radially outermost point of the cam surface 52a of the first take-up member 60 with respect to the main support axle 54. In other words, the abutment surface 66a of the first releasing member 66 is located radially inward from the radially outermost point of the cam surface 52a with respect to the main support axle 54. In this way, the earn surface 52a of the first take-up member 60 can prevent the first pulling member 62 from engaging the abutment surface 66a of the first releasing member 66 as the first operating member 43 is operated from the non-operated position to the operated position when the take-up member 56 is in the rest position. In other words, the first pulling member 62 is configured to engage with the abutment surface 66a when the take-up member 56 is in the take-up position.

The cam surface 66b is configured to selectively pivot the first position maintaining member 64 about the main pivot axle 54 to a releasing position. In this way, the first releasing member 66 releases the first take-up member 60 so that it returns to the rest position by the biasing force of the biasing member 65.

The first releasing member 66 is pivotally mounted on the main support axle 54. The biasing member 65 biases the first releasing member 66 via the first position maintaining member 64 in the releasing direction R2. In particular, the biasing member 65 biases the first position maintaining member 64 about the pivot pin 83 against the first releasing member 66. More specifically, the tip of the first position maintaining member 64 contacts the first releasing member 66 and effectively applies a biasing on the first releasing member 66 to pivot the first releasing member 66 in a direction that corresponds to the releasing direction R2 of the first take-up member 60. The second stationary support plate 52 is provided with a stop pin 52b that establishes end movement positions of the first releasing member 66.

Referring now to FIGS. 9, 10 and 24 to 35, the second actuation unit 42 will now be discussed in greater detail. Basically, as mentioned above, the second actuation unit 42 is operated by moving the second operating member 45 from the rest position to either the first operated position or the second operated position. As a result of the operation of the second operating member 45 in the first operating direction D1 toward the first operated position, the second pulling member 72 rotates the second take-up member 70 to perform a pulling operation. As a result of the operation of the second operating member 45 in the second operating direction D2 toward the second operated position, the second pulling member 72 rotates the second releasing member 76 to perform a releasing operation.

In the second actuation unit 42, second pulling member 72 rotates about the first rotational axis A1. The second take-up member 70 is rotatably mounted to the housing 38 about the second rotational axis A2. Thus, in the illustrated embodiment, the first take-up member 60 and the second take-up member 70 are configured to coaxially rotatable with respect to the base member about the second rotational axis A2. The first take-up member 60 and the second take-up member 70 are independently coaxially rotatable each other.

Now, the second operating member 45 will be discussed in greater detail. The second operating member 45 is configured to rotate about the second rotational axis A2 as the second operating member 45 moves from the rest position toward the first operated position. However, the second operating member 45 is configured to rotate about a third rotational axis A3 as the second operating member 45 moves from the rest position toward the second operated position. The third rotational axis A3 is established by the pivot axle 55. The third rotational axis A3 is different from the second rotational axis A2. Also the first rotational axis A1 is different from the second and third rotational axes A2 and A3.

As mentioned above, the second operating member 45 basically comprises two parts, i.e., the first part 46 and the second part 47. The first part 46 is rotatably disposed with respect to the mounting member 36 about the second rotational axis A2. The second part 47 is rotatably disposed with respect to the mounting member 36 about the third rotational axis A3. During a pulling operation, the first part 46 and the second part 47 rotate together about the second rotational axis A2 in response to the operation of the second operating member 45 toward the first operated position. During a releasing operation, the first part 46 rotates about the second rotational axis A2 and the second part 47 rotates about the third rotational axis AS in response to the operation of the second operating member 45 toward the second operated position. The second part 47 includes a first axle 88 that pivotally supports the second pulling member 72 on the second part 47 about the first rotational axis A1.

The first part 46 is a ring-shaped member that is rotatably mounted on the main support axle 54. In the illustrated embodiment, the first part 46 is a rigid member that is made of a suitable rigid material such as a rigid plastic material or a metallic material. The first part 46 includes a contact projection 46a and an opening 46b. The contact projection 46a of the first part 46 is configured to engage the second part 47 such that the biasing force of the biasing member 48 is transmitted to both the first part 46 and the second part 47 as explained below. The biasing member 48 is attached to the first part 46 via the opening 46b such that the first part 46 is biased in the releasing direction R2. In the illustrated embodiment, the biasing member 48 is a flat coiled torsion spring that is coiled around the main support axle 54. The biasing member 48 has a first end disposed in the opening 46b of the opening 46b and a second end hooked onto the second releasing member 76. Thus, the biasing member 48 also biases in the second releasing member 76 in the take-up direction R1.

The second part 47 constitutes the user operating part of the second operating member 45 that extends out of the housing 38. The second part 47 is movably mounted relative to the housing 38 on the pivot axle 55. The second part 47 includes an external portion 47a and an internal portion 47b. The second pulling member 72 is pivotally mounted on the internal portion 47b of the second part 47 by the first axle 88. The first axle 88 establishes the first rotational axis A1. The first rotational axis A1 rotates about the third rotational axis A3 in response to the operation of the second operating member 45 toward the second operated position. The second pulling member 72 is biased to contact the second take-up member 70 by the biasing member 73. The biasing member 73 has a coiled portion mounted on the pivot pin 88. A first end of the biasing member 73 contacts the second pulling member 72, and a second end of the biasing member 73 is attached to the internal portion 47b of the second part 47. In this way, the biasing member 73 applies a biasing force on the second pulling member 72 to bias the second pulling member 72 towards the second take-up member 70.

The second part 47 of the second operating member 45 includes an elongated slot 47c through which the third rotational axis A3 passes. In particular, the internal portion 47b of the second part 47 is mounted on the pivot axle 55 such that an end of the pivot axle 55 is disposed in the elongated slot 47c. Preferably, the elongated slot 47c is an arcuate slot. The second part 47 slides on the pivot axle 55 when the second operating member 45 is operated in the first operating direction D1 from the rest position. Thus, during a pulling operation, the third rotational axis A3 relatively moves along the elongated slot 47c while the second operating member 45 is operated from the rest position toward the first operated position. When the second operating member 45 is in the rest position, the pivot axle 55 abuts the end of the elongated slot 47c to define the rest position of the second operating member 45. Also, during the pulling operation, the pivot axle 55 abuts the other end of the elongated slot 47c to restrict a movement of the second operating member 45 in the first operating direction D1. Also during a pulling operation, the first and second parts 46 and 47 pivot together about the second rotational axis A2. On the other hand, the second part 47 pivots on the pivot axle 55 when the second operating member 45 is operated in the second operating direction D2 from the rest position. Thus, during a releasing operation, the third rotational axis A3 remains stationary within the elongated slot 47c in a direction along the elongated slot 47c while the second operating member 45 is operated from the rest position toward the second operated position. Also during a releasing operation, the second part 47 pivots on the third rotational axis A3 and the first part 46 pivots on the second rotational axis A2. During the releasing operation, a pivoting direction of the first part 46 about the second rotational axis A2 and a pivoting direction of the second part 47 about the third rotational axis A3 are different from each other.

The internal portion 47b of the second part 47 further includes a first contact projection 47d, a second contact projection 47e and a third contact projection 47f. In the rest position of the second operating member 45, the first and second contact projections 47d and 47e are held in contact with the outer peripheral edge of the first part 46 by the biasing force of the biasing member 48. In particular, the biasing member 48 biases the first part 46 in the releasing direction D2 such that the contact projection 46a of the first part 46 contacts and applies the biasing force of the biasing member 48 to the first contact projection 47d of the second part 47. As a result of this transmission of the biasing force to the first contact projection 47d, the second part 47 is biased on the main support axle 54 such that the second contact projection 47e contacts the outer peripheral edge of the first part 46.

The second contact projection 47e further engages and moves the second pulling member 72 upon operation of the second operating member 45 from the rest position toward the second operated position. In this way, the second contact projection 47e pivots the second pulling member 72 away from the second take-up member 70 so that the second pulling member 72 will not interfere with the rotation of the second take-up member 70 in the releasing direction R2.

The third contact projection 47f of the second part 47 forms a release actuation abutment. In other words, the third contact projection 47f is configured to rotate the second releasing member 76 in response to the second operating member 45 being operated in the second operating direction D2 from the rest position to perform a releasing operation. During a releasing operation, the second part 47 pivots on the third rotational axis A3. This pivoting of the second part 47 causes the first contact projection 47d of the second part 47 to apply a force on the contact projection 46a of the first part 46 and to rotate the first part 47 on the second rotational axis A2 in the take-up direction R1. As the the second part 47 pivots on the third rotational axis A3, the third contact projection 47f contacts the second releasing member 76 and rotates the second releasing member 76 in the releasing direction D2.

The second take-up member 70 is rotatably mounted on the main support axle 54. Thus, the second take-up member 70 is configured to rotate about a second rotational axis A2. The second take-up member 70 is a rigid member that is made from a suitable rigid material such as a hard plastic material or a metallic material. The second take-up member 70 includes a cable attachment portion 70a, a plurality of pulling teeth or abutments 70b and a plurality of positioning teeth or abutments 70c. While the second take-up member 70 formed a one-piece member, it will be apparent from this disclosure that the second take-up member 70 can be made of several separate elements such as, for example, the first take-up member 60. In this embodiment, the plurality of pulling teeth or abutments 70b and the plurality of positioning teeth or abutments 70c are formed as a one piece unitary member with the cable attachment portion 70a. However, each pulling tooth or abutment may be formed at a ratchet wheel which is a separate member from the cable attachment portion 70a and non-rotatably attached to cable attachment portion 70a, if needed and/or desired. The cable attachment portion 70a is located adjacent the outer periphery of the second take-up member 70. The cable attachment portion 70a is a conventional part that is configured to receive a nipple that is fixed to the inner wire 32a. The pulling abutments 70b are arranged to be engaged by the pawl of the second pulling member 72 for pivoting the second take-up member 70 in the take-up direction R1 about the main support axle 54. In other words, the pawl of the second pulling member 72 contacts one of the pulling abutments 70b during a pulling operation of the second actuation unit 42. The pulling member 72 is facing one of the pulling abutments 70b when the second operating member 45 is in the rest position. In other words, the pulling member 72 is intersecting with a rotational pass of the one of the pulling abutments 70b about the second rotational axis A2. Preferably, the pulling member 72 may be in contacting with one of the pulling abutments 70b when the second operating member 45 is in the rest position or slightly spaced apart from the one of the pulling abutments 70b in the releasing direction R2. Thus, upon starting the pulling operation of the second actuation unit 42, the second pulling member 45 can abut and move the one of the pulling abutments 70b quickly. The positioning abutments 70c are arranged to be engaged by the pawl of the second position maintaining member 74 for holding the second take-up member 70 in one of the predetermined positions against the biasing force of the biasing member 71. Thus, the second take-up member 70 is prevented from rotating in the releasing direction R2 about the second rotational axis A2.

In the illustrated embodiment, the second pulling member 72 is arranged to engage the second take-up member 70 for pulling the second control cable 32. In particular, as the second operating member 45 is pivoted from the rest position to the take-up position, the second pulling member 72 rotates the second take-up member 70 to pull the second control cable 32. Upon releasing the first operating member 43 from the first operated position, the first operating member 43 and the second pulling member 72 all automatically returns their rest positions.

The second position maintaining member 74 is pivotally disposed relative to the base member about a fourth rotational axis A4. In particular, the second position maintaining member 74 is pivotally mounted on a pivot pin 90 that establishes the third rotational axis A4. The pivot pin 90 is mounted between the second and third support plates 52 and 53. The second position maintaining member 74 is biased towards the second take-up member 70 by the biasing member 75. The biasing member 75 has a coiled portion mounted on the pivot pin 90. A first end of the biasing member 75 contacts the second position maintaining member 74, and a second end of the biasing member 75 is attached to the second support plate 52.

The second releasing member 76 is a rigid member that is made of a suitable rigid material such as a rigid plastic material or a metallic material. The second releasing member 76 is rotatably mounted on the main support axle 54. As mentioned above, the second releasing member 76 is biased in the take-up direction R1 by the biasing force of the biasing member 48. The second releasing member 76 includes an actuation tab or abutment 76a and a cam surface 76b. The actuation abutment 76a is configured and arranged to be contacted by the third contact projection 47f of the second part 47 as the second operating member 45 is operated in the second operating direction D2 from the rest position to perform a releasing operation. In other words, the second releasing member 76 is rotated about the second rotational axis A2 in the releasing direction R2 as the second operating member 45 is operated in the second operating direction D2 from the rest position to perform a releasing operation. As the second releasing member 76 rotates in the releasing direction R2, the cam surface 76b contacts the pawl of the second position maintaining member 74 and pivots the second position maintaining member 74 about the fourth rotational axis A4. The second position maintaining member 74 is then disengaged from the positioning abutment 70c that was engaged with the second position maintaining member 74. When the second operating member 45 is released, the second releasing member 76 rotated in the take-up direction R1 and the second position maintaining member 74 pivots back into engagement with one of the positioning abutments 70c. In this way, the second releasing member 76 is configured to move the second position maintaining member 74 to the releasing position in response to the operation of the second operating member 45 toward the second operated position. Consequently, the engagement between the second position maintaining member 74 and the positioning abutment 70c is shifted so that the second control cable 32 is released.

Figure 11:
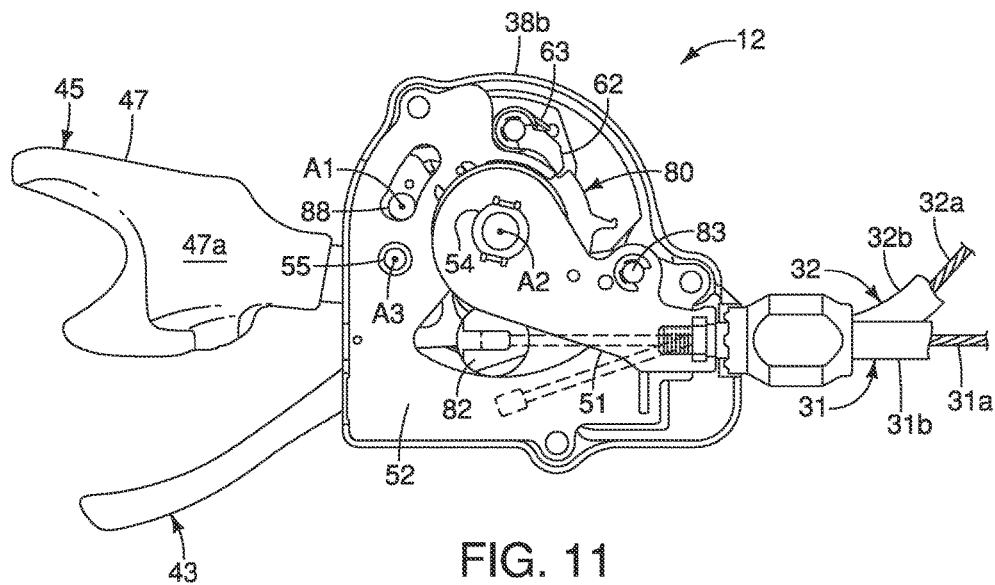
FIG. 11 is a top view of the bicycle control device illustrated in FIGS. 3 and 4 with the top housing part of the housing removed to illustrate selected parts of the internal parts of the bicycle control device in their rest positions.
Figure 12:
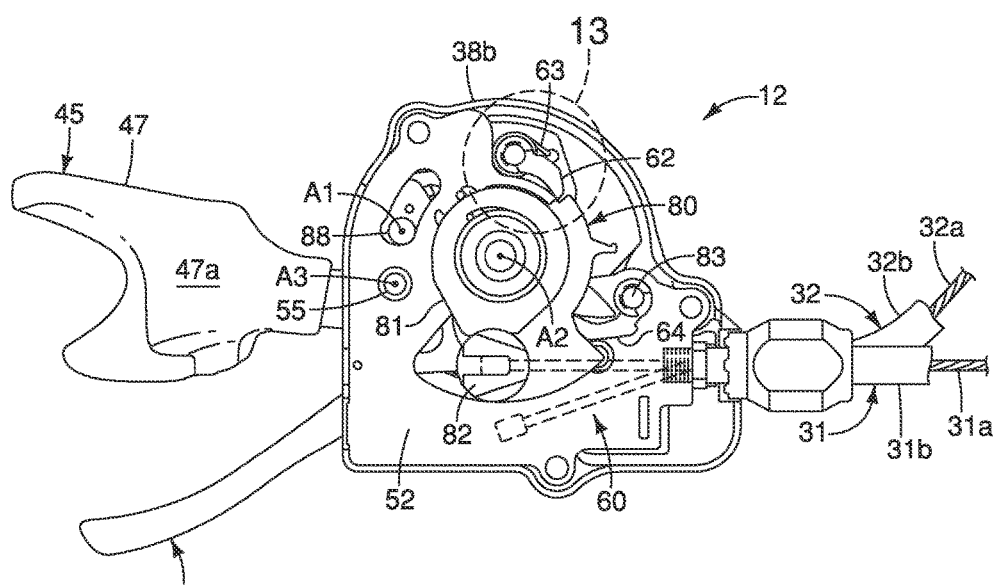
FIG. 12 is another top view, similar to FIG. 11, of the bicycle control device, but with selected parts removed to more clearly show the first take-up member and the position maintaining member.
Figure 13:
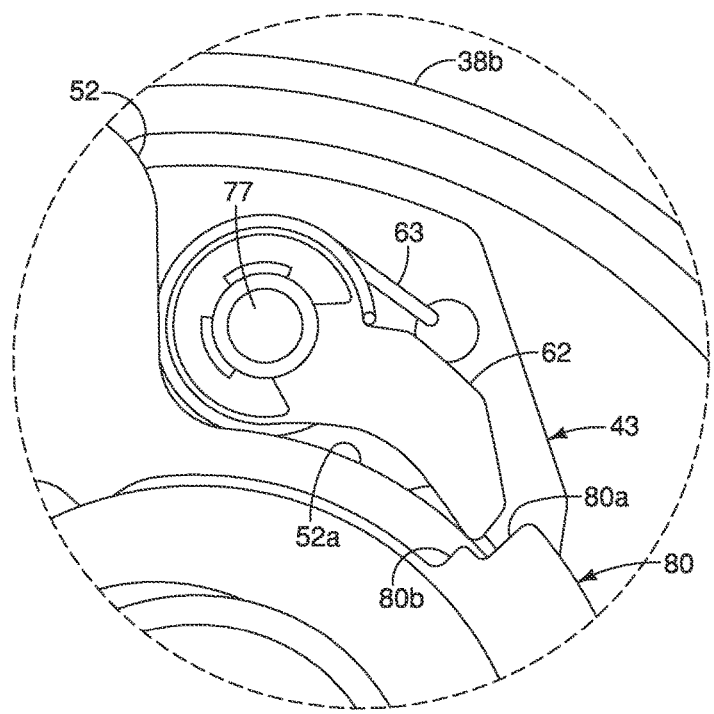
FIG. 13 is an enlarged top view of a selected (encircled) portion of the bicycle control device illustrated in FIG. 12 to show the first pulling member in the rest position.
Figure 14:
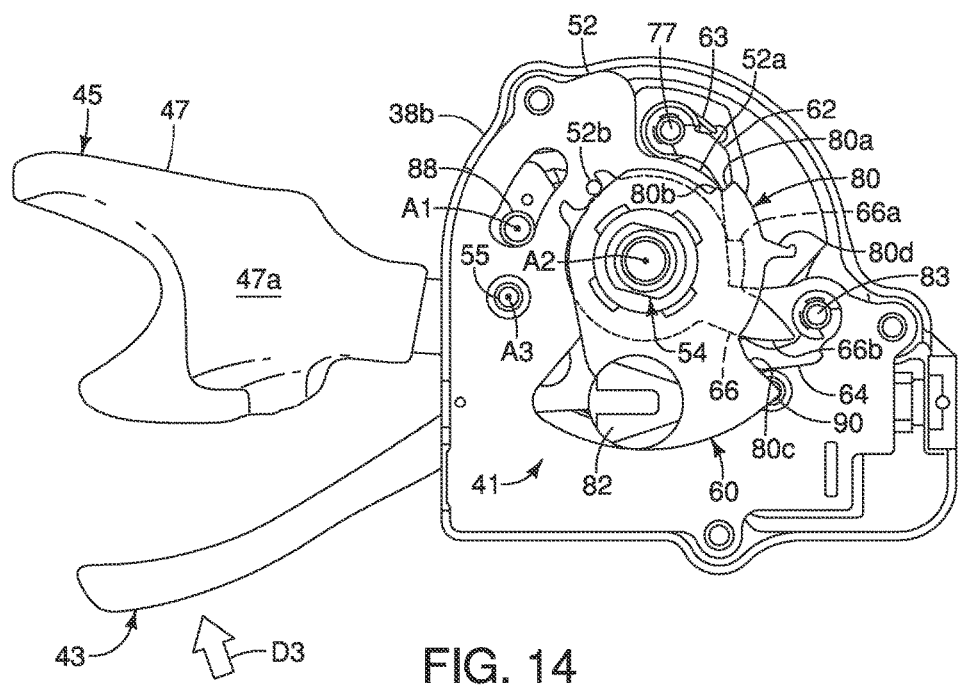
FIG. 14 is a top view, similar to FIG. 12, of selected internal parts of the first actuation unit of the bicycle control device, but with the first operating lever having been moved from the rest position such that the first pulling member contacts the first take-up member.
Figure 15:
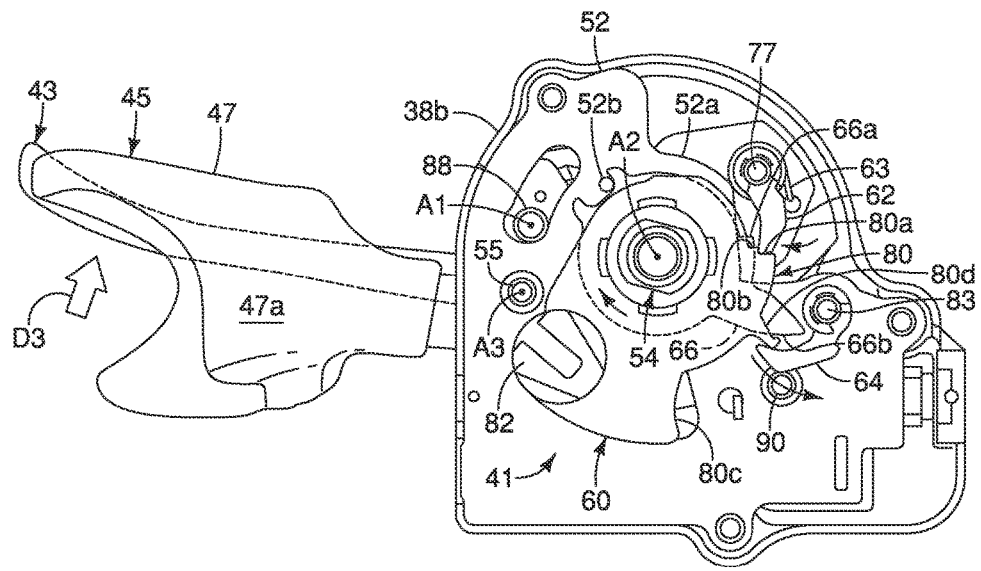
FIG. 15 is a top view, similar to FIG. 14, of selected internal parts of the first actuation unit of the bicycle control, but with the first operating lever having been moved further from the rest position than the position shown in FIG. 14 such that the first pulling member starts to pivot the first take-up member without moving the release member and to start pivoting the first position maintaining member (e.g., a holding pawl) without moving the release member.
Figure 16:
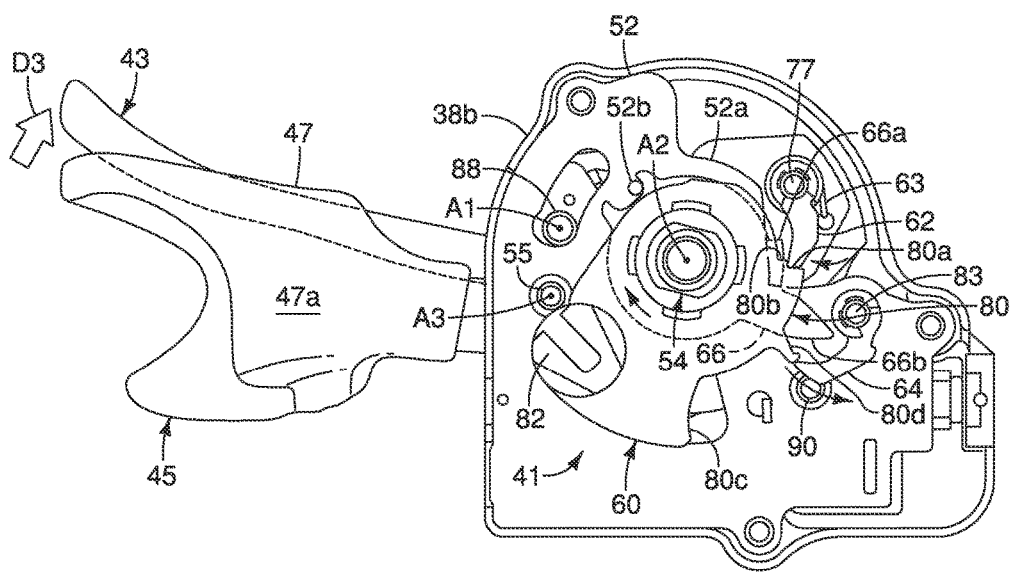
FIG. 16 is a top view, similar to FIGS. 14 and 15, of selected internal parts of the first actuation unit of the bicycle control device, but with the first operating lever having been moved further from the position in FIG. 15 to further pivot the first take-up member and to further pivot the first position maintaining member to a releasing position without moving the release member.
Figure 17:
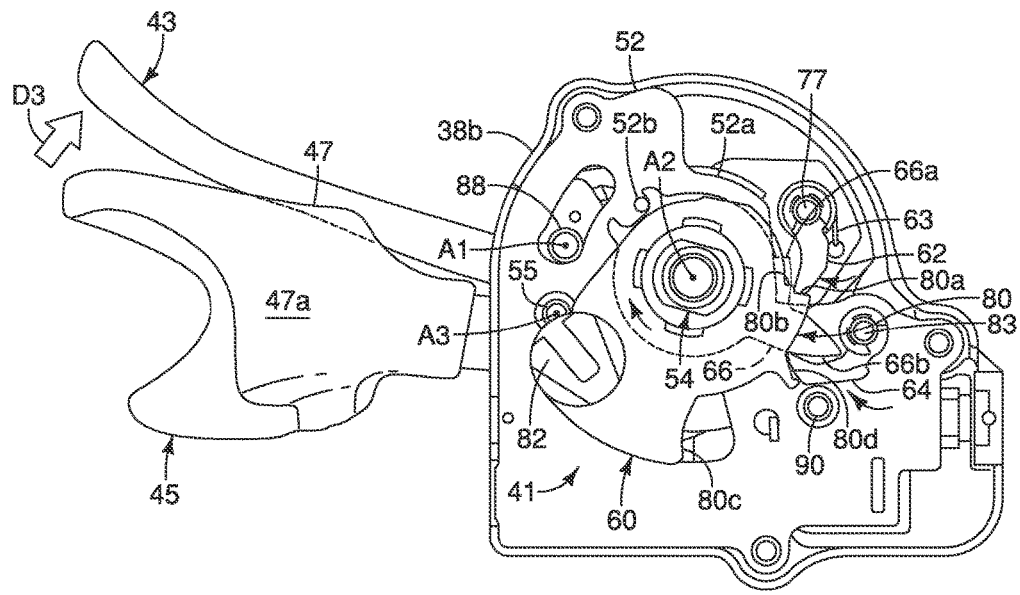
FIG. 17 is a top view, similar to FIGS. 14 to 16, of selected internal parts of the first actuation unit of the bicycle control device, but with the first operating lever having been moved further from the position in FIG. 16 to further pivot the first take-up member and to allow the first position maintaining member to pivot back to a holding position without moving the release member.
Figure 18:
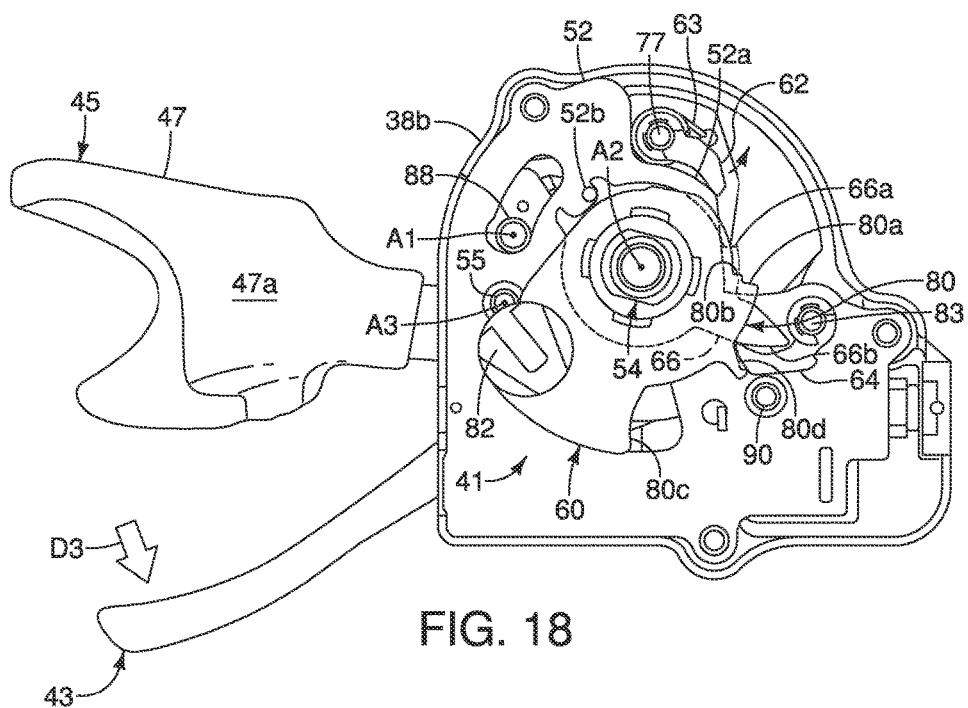
FIG. 18 is a top view, similar to FIGS. 14 to 17, of selected internal parts of the first actuation unit of the bicycle control device, but with the first take-up member in a take-up position and the remaining parts returned to their rest positions.

Referring to FIGS. 11 to 18, the bicycle control device 12 is illustrated in which the first actuation unit 41 performs a pulling operation of the first control cable 31 by operating the first operating member 43. FIGS. 11 and 12 show the bicycle control device 14 in a non-operated state on the illustrated parts are in their rest positions. FIGS. 13 to 18 show the parts of the bicycle control device 14 that are sequentially moved as the first operating member 43 is pivoted from the non-operated (rest) position to the operated position and then back to the non-operated (rest) position to perform the pulling operation of the first control cable 31.

Basically, during the pulling operation of the first control cable 31 by operating the first operating member 43, the pawl of the first pulling member 62 engages the first engagement abutment 80a of the first take-up member 60 to rotate the first take-up member 60 as seen in FIGS. 14 to 17. As the first take-up member 60 rotates, the first position maintaining member 64 is pivoted about its pivot axis to a releasing position (FIG. 16) and then pivots back to the holding position (FIG. 16) to engage the second positioning abutment 80d. Thus, the first position maintaining member 64 holds the first take-up member 60 in the take-up position. Meanwhile, upon releasing the first operating member 43, the first operating member 43 returns to the rest position.

Figure 19:
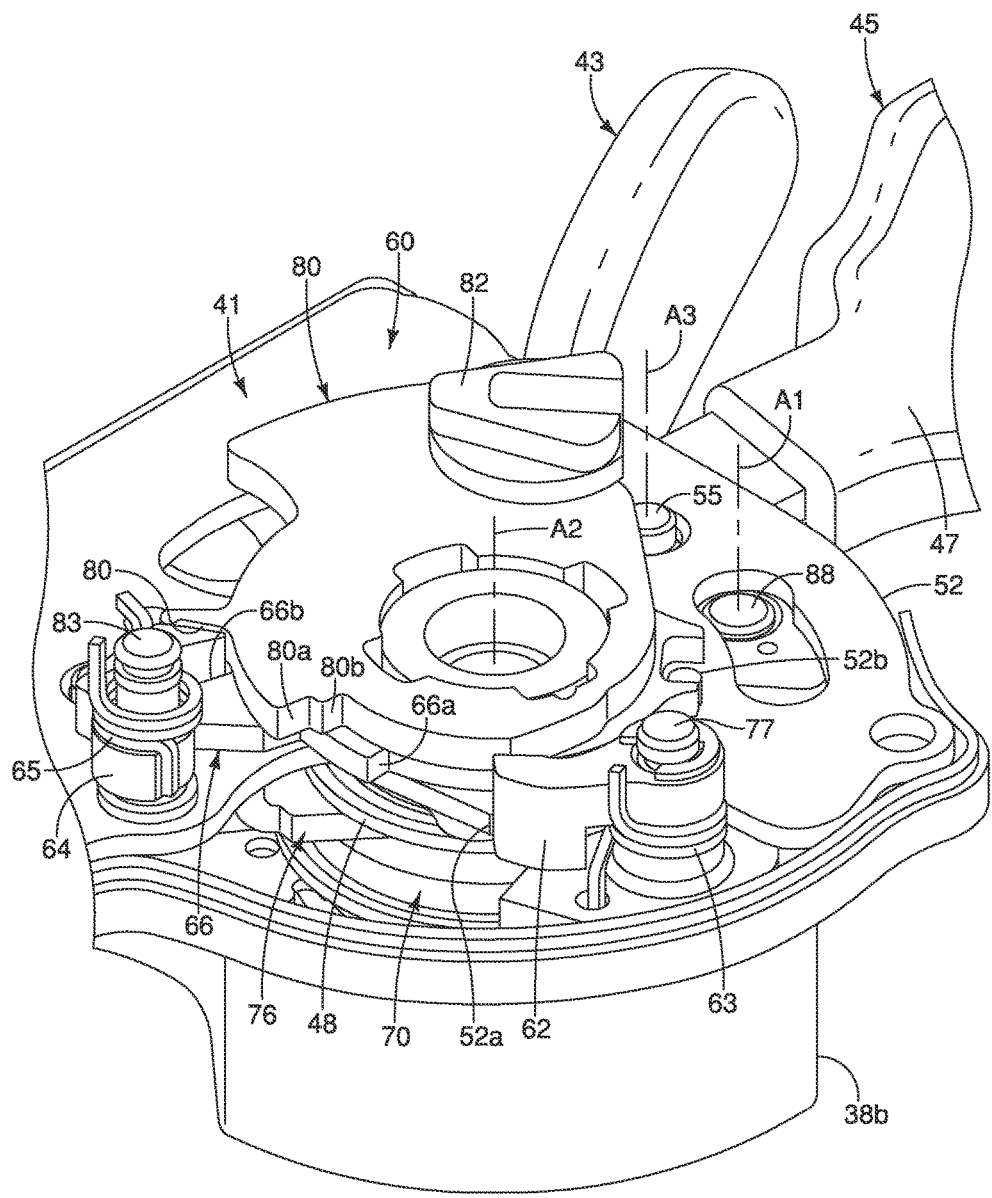
FIG. 19 is an enlarged top perspective view of a selected portion of the bicycle control device showing the first take-up member in a take-up position and the remaining parts in their rest positions.
Figure 20:
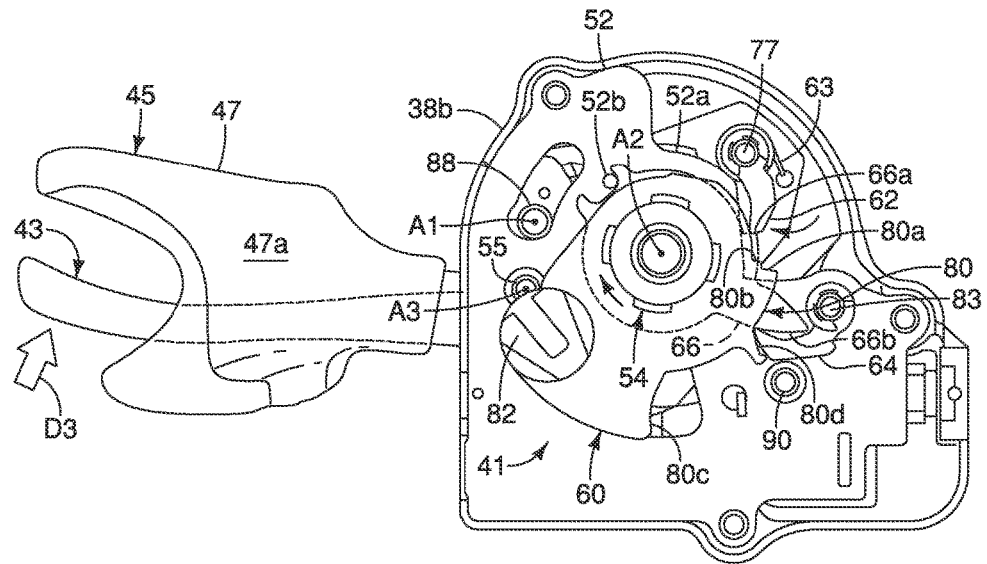
FIG. 20 is a top view of selected internal parts of the first actuation unit of the bicycle control device, but with the first operating lever having been moved from the rest position such that the first pulling member engages an abutment of the release member to start performing a first releasing operation without moving the first take-up member, which is in the take-up position.
Figure 21:
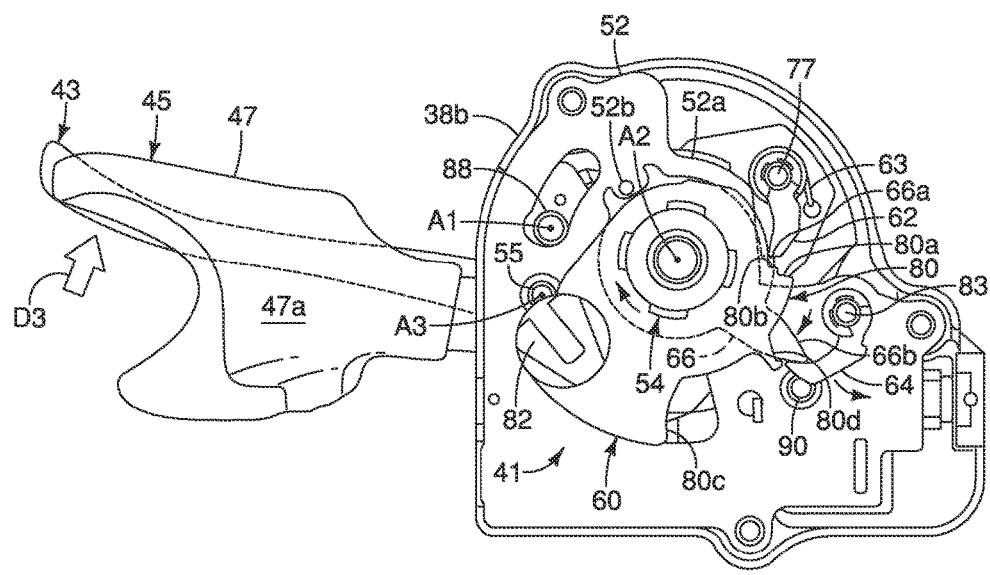
FIG. 21 is a top view, similar to FIG. 20, of selected internal parts of the first actuation unit of the bicycle control device, but with the first operating lever having been moved further from the position in FIG. 20 to pivot the release member, which pivots the first position maintaining member from the holding position towards the releasing position without moving the first take-up member, which is in the take-up position.
Figure 22:
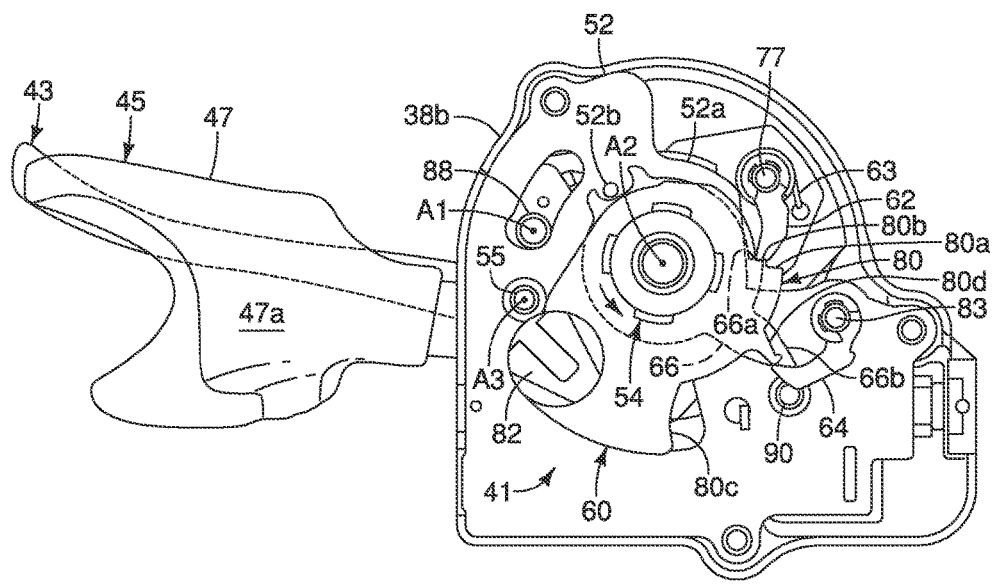
FIG. 22 is a top view, similar to FIGS. 20 and 21, of selected internal parts of the first actuation unit of the bicycle control device, but with the first operating lever having been moved further from the position in FIG. 21 such that the release member holds the first position maintaining member in the releasing position to release the first take-up member, which is still shown in the take-up position.
Figure 23:
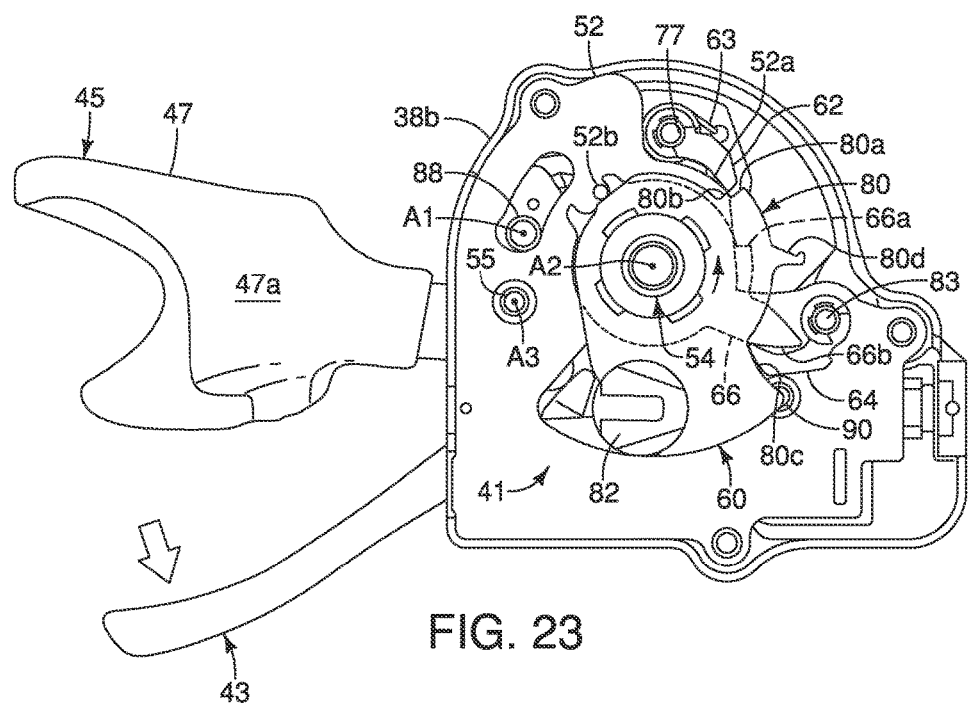
FIG. 23 is a top view, similar to FIGS. 20 to 22, of selected internal parts of the first actuation unit of the bicycle control device, but with the first position maintaining member (e.g., the first holding pawl) moved back to a holding position and the first take-up member moved back to the rest position such that the first take-up member abuts against the first position maintaining member.

Referring to FIGS. 19 to 23, the bicycle control device 12 is illustrated in which the first actuation unit 41 performs a releasing operation of the first control cable 31 by operating the first operating member 43. FIGS. 19 and 23 show the bicycle control device 14 in a non-operated state with the first take-up member 60 in the take-up position. FIGS. 20 to 22 show the parts of the bicycle control device 12 be sequentially moved as the first operating member 43 is pivoted from the non-operated (rest) position to the operated position and then back to the non-operated (rest) position to perform the releasing operation of the first control cable 31.

Basically, during the releasing operation of the first control cable 31 by operating the first operating member 43, the pawl of the first pulling member 62 engages the abutment surface 66a of the first releasing member 66 to rotate the first releasing member 66. Because the first engagement abutment 80a is offset from the abutment surface 66a in the take-up direction R1 when the first take-up member 60 is in the take-up position, the pawl of the first pulling member 62 does not engage with the first engagement abutment 80a. As the first releasing member 66 rotates in the take-up direction R1, the cam surface 66b pivots the first position maintaining member 64 about its pivot axis to the releasing position to release the first take-up member 60 so that the pawl of the first pulling member 62 can returns to the rest position by the biasing three of the biasing member 61. Upon releasing the first operating member 43, the first releasing member 66 returns to the rest position and the first position maintaining member 64 pivots about its pivot axis to the holding position to abut against the first positioning abutment 80c. Thus, the first position maintaining member 64 holds the first take-up member 60 in the released position. Also, the first pulling member 62 is moved by the second engagement abutment 80b in the releasing direction R2 with a guide of the cam surface 52a to interfere with a rotational pass of the first engagement abutment 80a when the first operating member 43 is in the rest position.

Figure 24:
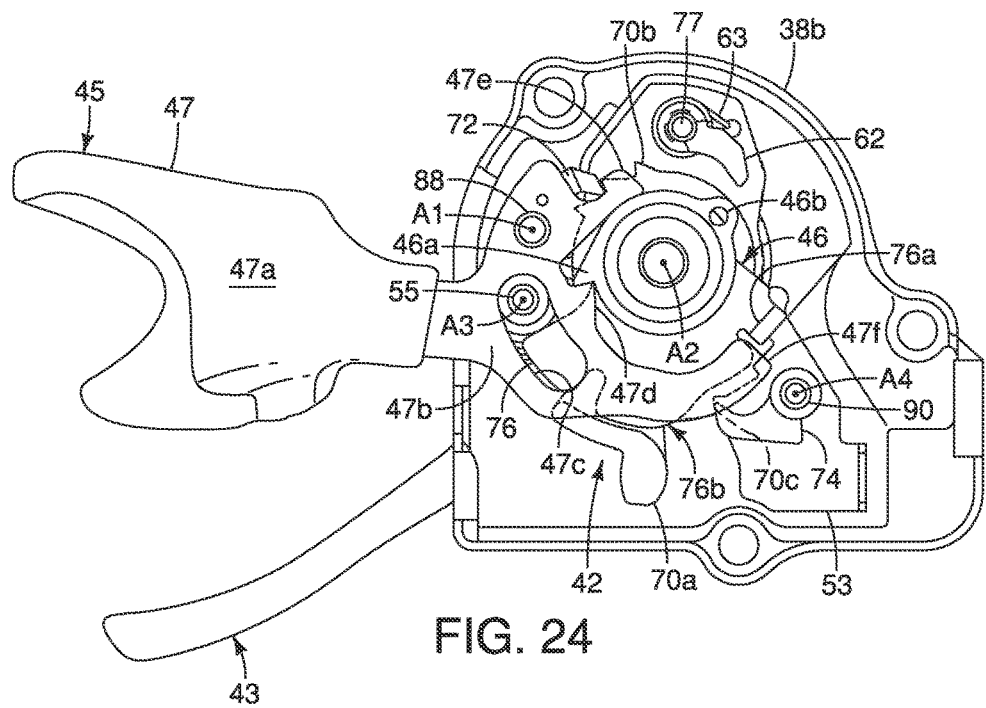
FIG. 24 is a top view of selected internal parts of the second actuation unit of the bicycle control device, with the internal parts of the bicycle control device in their rest positions and the second take-up member in a first (middle) take-up position.
Figure 25:
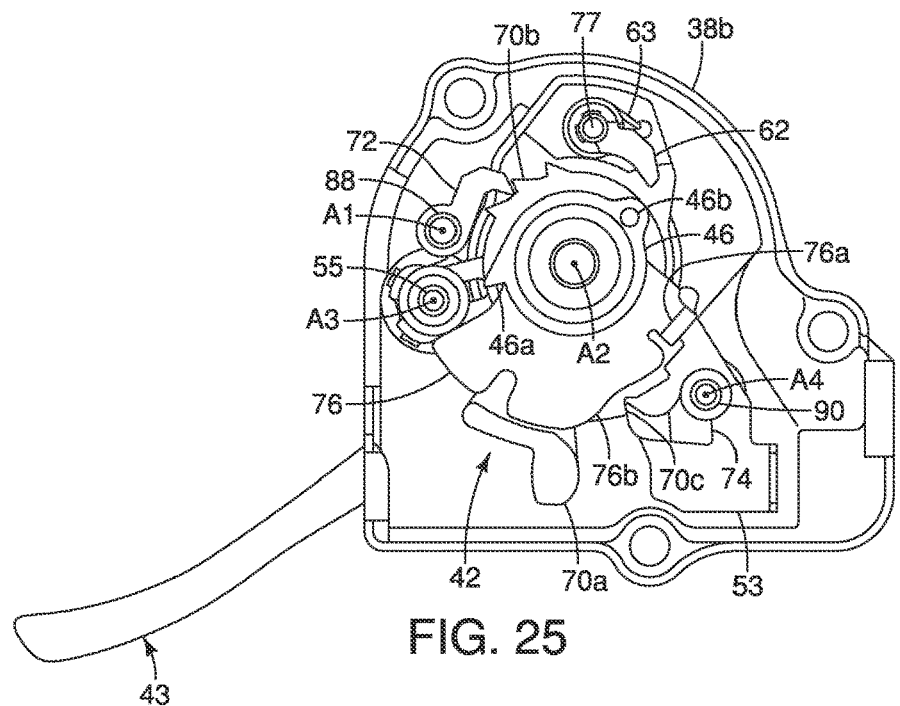
FIG. 25 is another top view, similar to FIG. 24, of selected internal parts of the second actuation unit of the bicycle control device, but with the second operating member removed to show the selected internal parts of the bicycle control device in their rest positions and the second take-up member is in a first (middle) take-up position.
Figure 26:
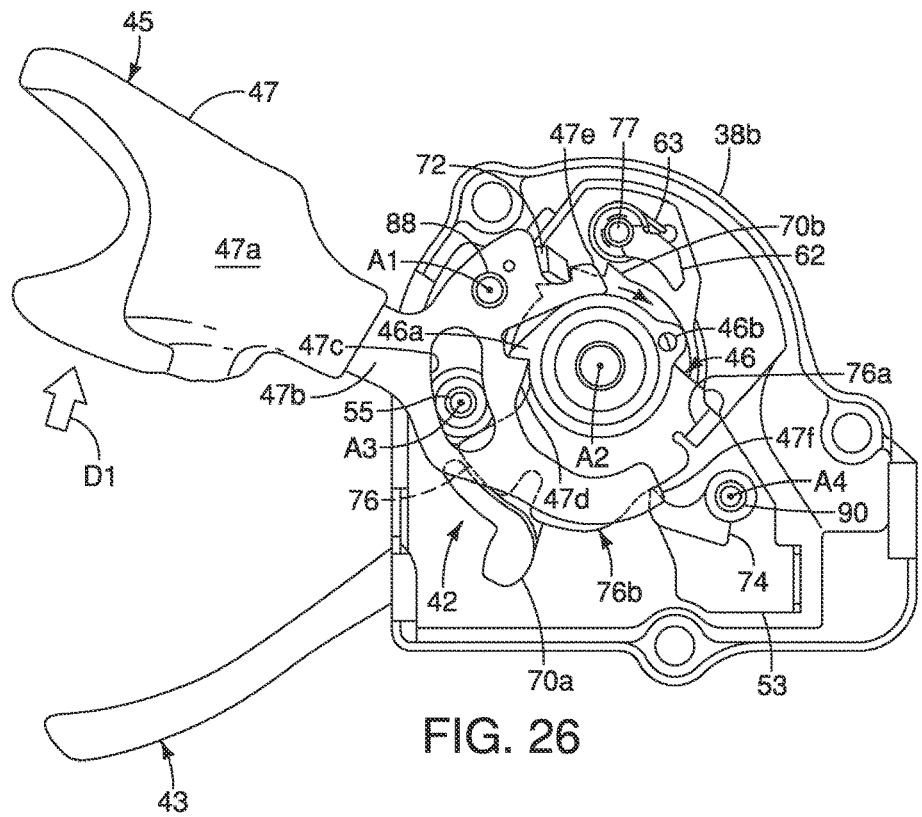
FIG. 26 is a top view, similar to FIG. 24, of selected internal parts of the second actuation unit of the bicycle control device, but with the second operating member pivoted about the first rotational axis from the rest position of FIG. 24 to the first operated position such that the second pulling member rotates the second take-up member.
Figure 27:
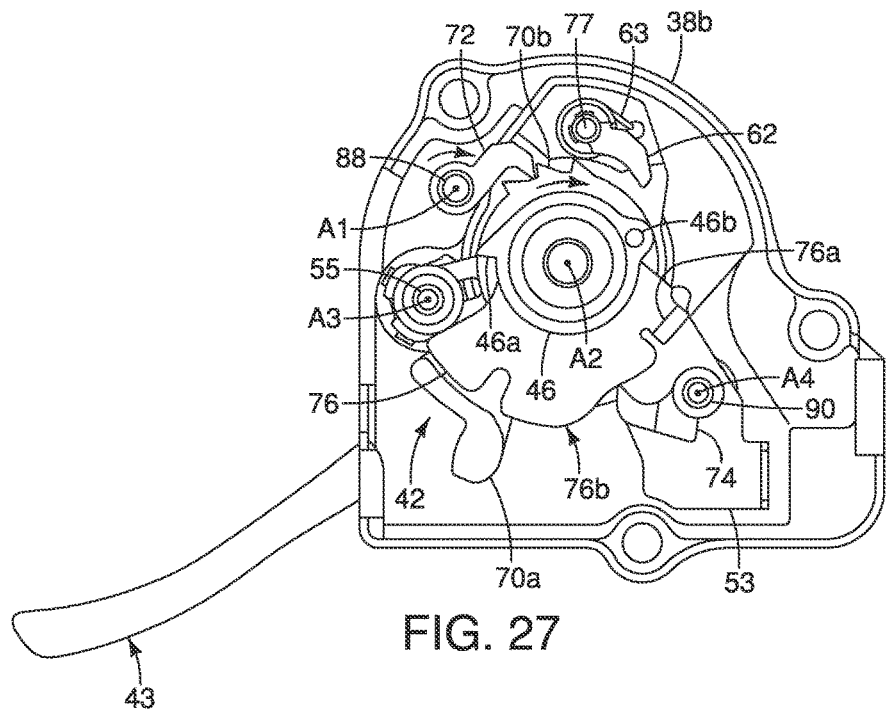
FIG. 27 is another top view, similar to FIG. 26, of selected internal parts of the second actuation unit of the bicycle control device, but with the second operating member removed to show the positions of the selected internal parts of the bicycle control device while the second operating member held in the first operated position.
Figure 28:
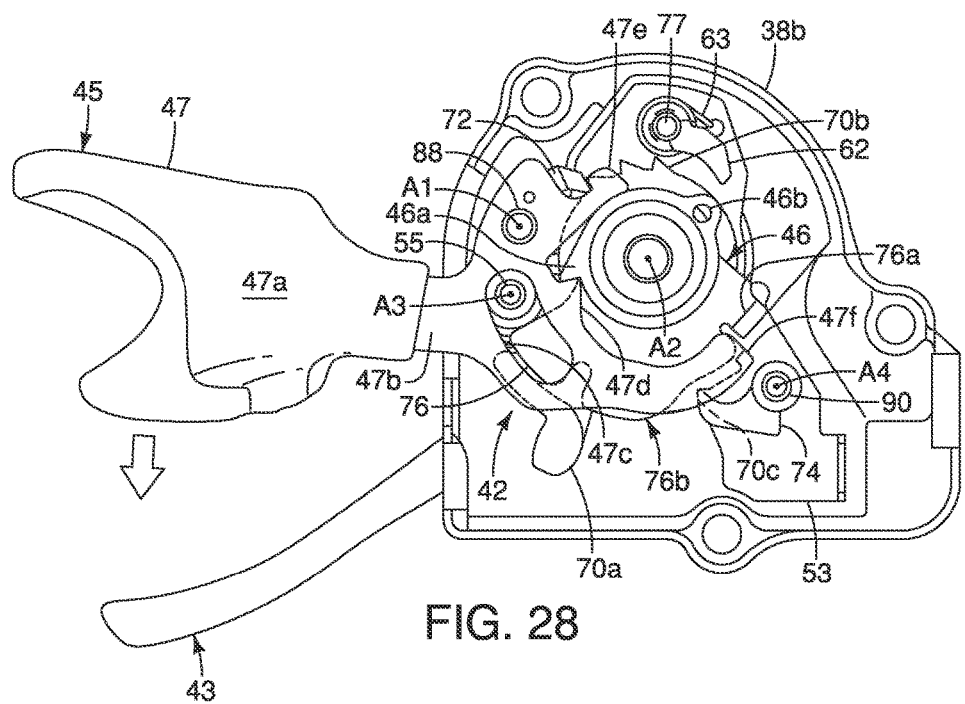
FIG. 28 is a top view, similar to FIG. 24, of selected internal parts of the second actuation unit of the bicycle control device, but with the second operating member pivoted back to the rest position and the second take-up member in a second (full) take-up position.
Figure 29:
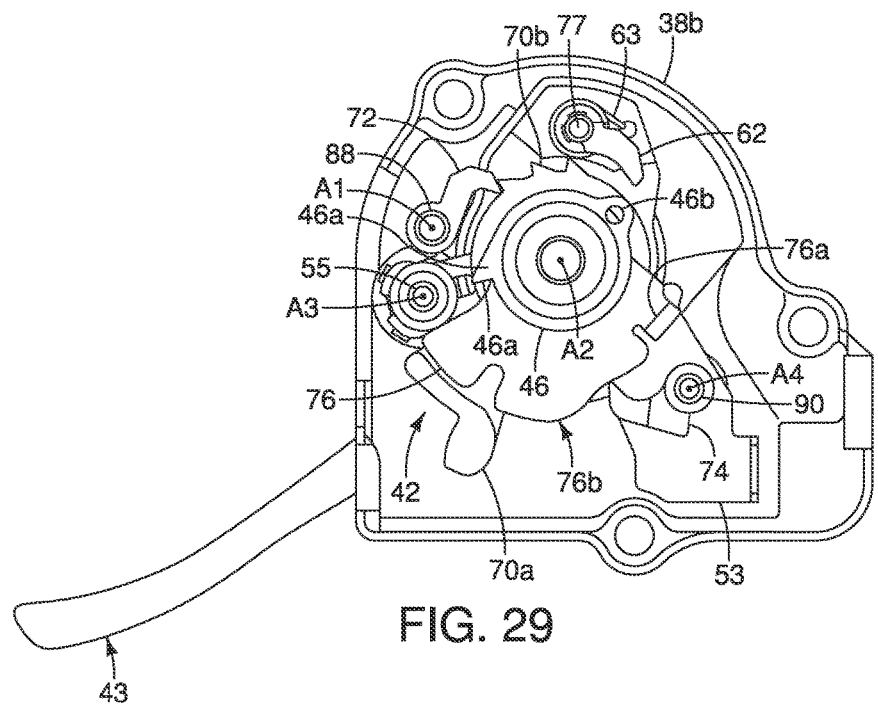
FIG. 29 is another top view, similar to FIG. 28, of selected internal parts of the second actuation unit of the bicycle control device, but with the second operating member removed to show the positions of the selected internal parts of the bicycle control device while the second operating member is in the rest position and the second take-up member is in a second (full) take-up position.

Referring to FIGS. 24 to 29, the bicycle control device 12 is illustrated in which the second actuation unit 42 performs a pulling operation of the second control cable 32 by pivoting the second operating member 45 from the rest (non-operated) position to the first operated position. FIGS. 24 and 25 show parts of the bicycle control device 12 that pertain the second actuation unit 42 in their rest positions. FIGS. 26 to 29 show the parts of the bicycle control device 12 be sequentially moved as the second operating member 45 is pivoted from the rest (non-operated) position to the first operated position and then back to the rest position. FIGS. 24 and 25 show the second take-up member 70 in the middle predetermined position.

Basically, during the pulling operation of the second control cable 32 by operating the second operating member 45, the pawl of the second pulling member 72 engages one of the pulling abutments 70b of the second take-up member 70 to rotate the second take-up member 70 as seen in FIGS. 26 to 29. As the second take-up member 70 rotates, the pawl of the second position maintaining member 74 slides along the peripheral edge of the second take-up member 70 to engage the next one of the positioning abutments 70c of the second take-up member 70. Thus, the second position maintaining member 74 holds the second take-up member 70 in the next predetermined position. Meanwhile, upon releasing the second operating member 45, the second operating member 45 returns to the rest position.

Figure 30:
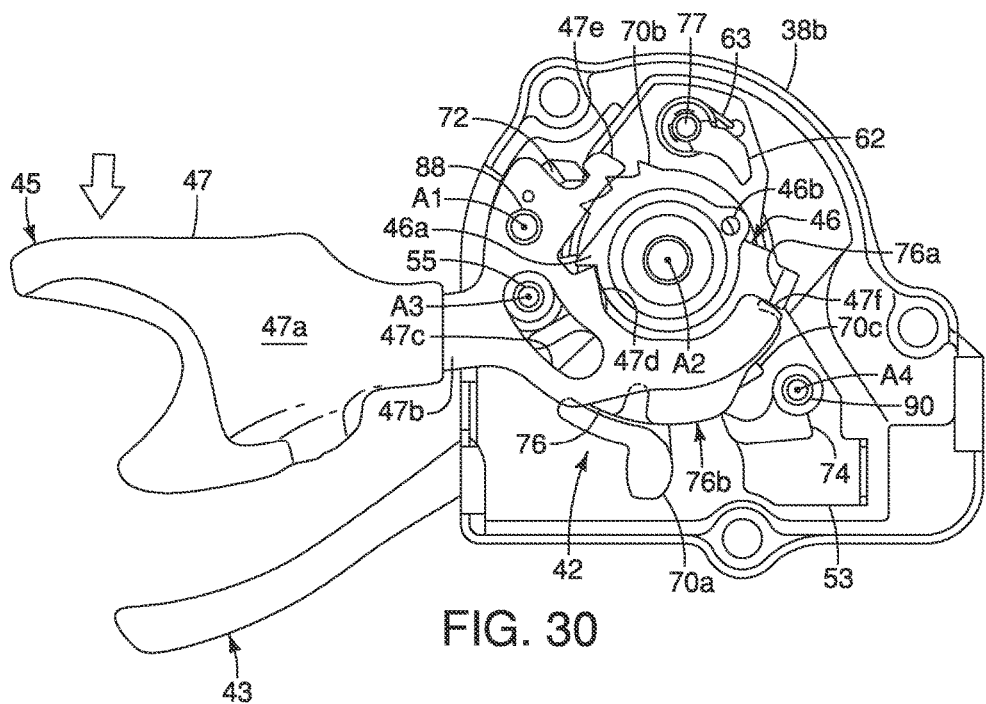
FIG. 30 is a top view, similar to FIG. 24, of selected internal parts of the second actuation unit of the bicycle control device, but with the second operating member pivoted about the second rotational axis from the rest position of FIG. 24 to the second operated position such that the second pulling member disengages the second take-up member and the second position maintaining member (e.g., the second holding pawl) disengages the second take-up member so that the second take-up member can rotate one position.
Figure 31:
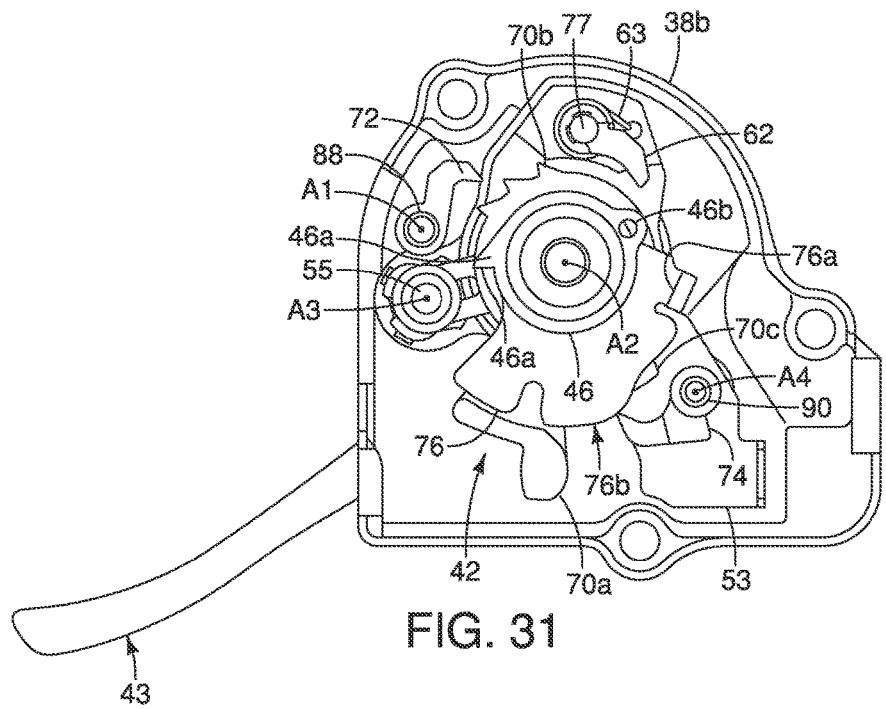
FIG. 31 is another top view, similar to FIG. 30, of selected internal parts of the second actuation unit of the bicycle control device, but with the second operating member removed to show the positions of the selected internal parts of the bicycle control device while the second operating member is in the second operated position, the second pulling member is disengaged from the second take-up member and the second position maintaining member is disengaged from the second take-up member, and the second take-up member is still in the second (full) take-up position.
Figure 32:
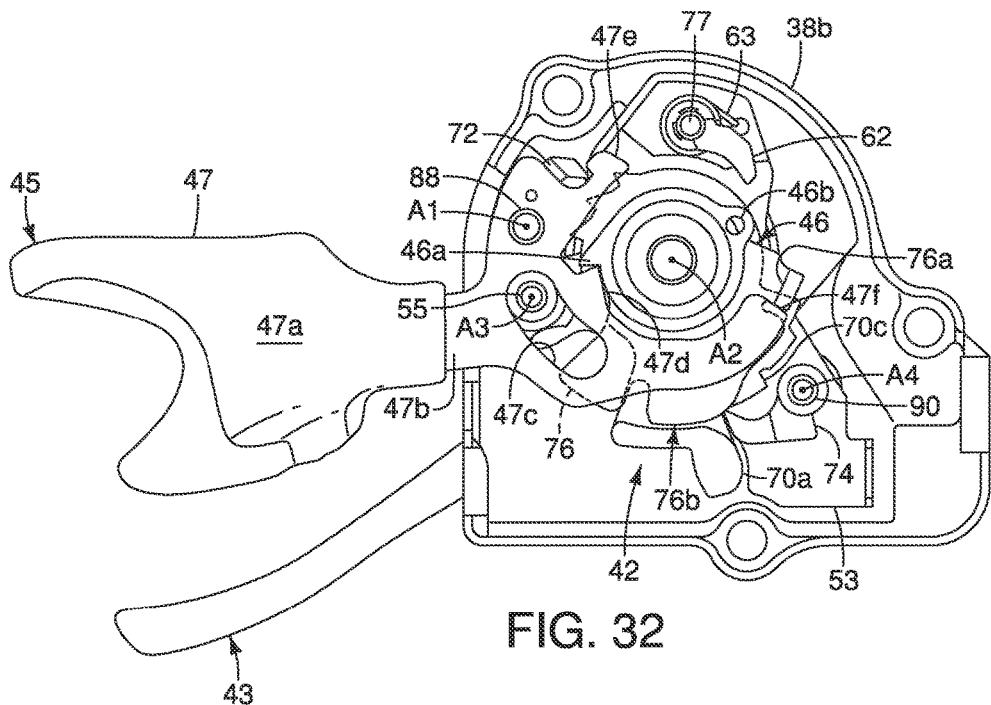
FIG. 32 is a top view, similar to FIG. 30, of selected internal parts of the second actuation unit of the bicycle control device, but with the second take-up member rotated in the second operating (releasing) direction such that the second take-up member abuts against the second position maintaining member.
Figure 33:
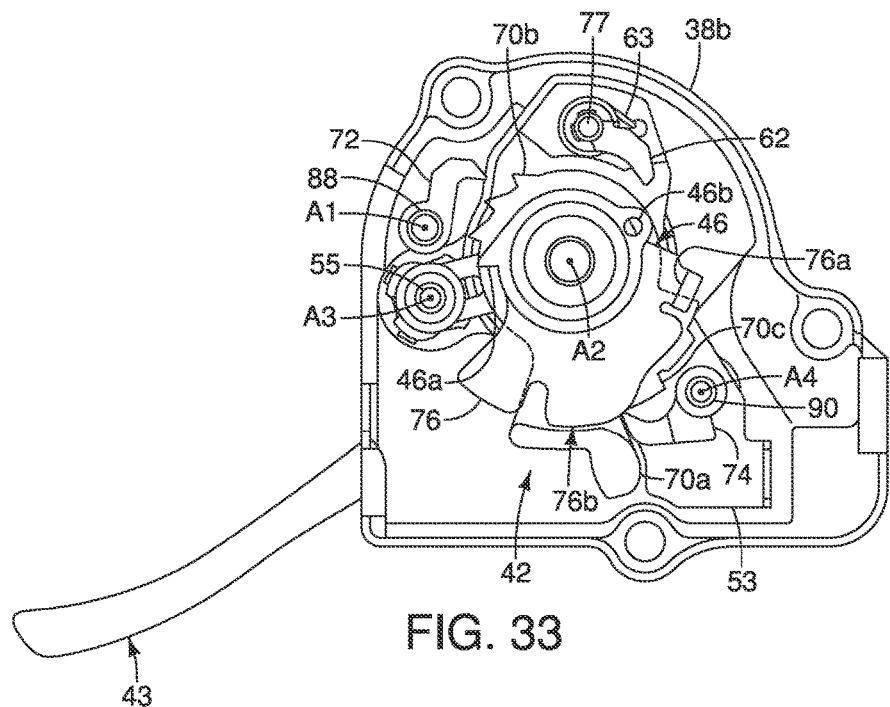
FIG. 33 is another top view, similar to FIG. 32, of selected internal parts of the second actuation unit of the bicycle control device, but with the second operating member removed to show the positions of the selected internal parts of the bicycle control device while the second operating member is in the second operated position, the second pulling member is disengaged from the second take-up member and the second position maintaining member is disengaged from the second take-up member, and the second take-up member is still in the second (full) take-up position.
Figure 34:
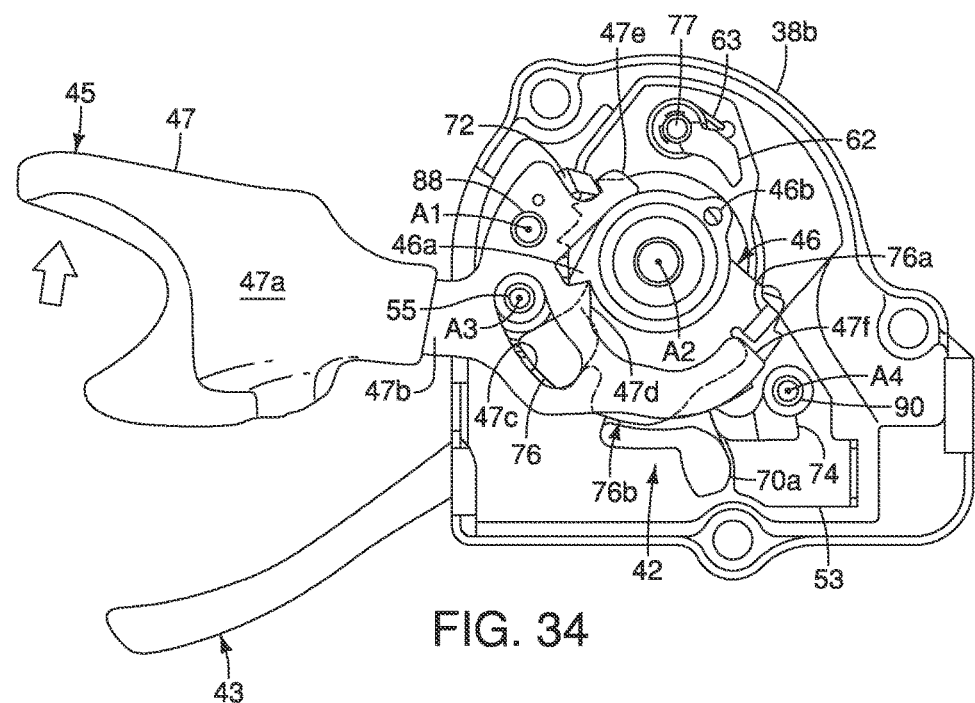
FIG. 34 is a top view, similar to FIG. 24 of selected internal parts of the second actuation unit of the bicycle control device, but with the second operating member pivoted back to the rest position and the second take-up member in a fully released position.
Figure 35:
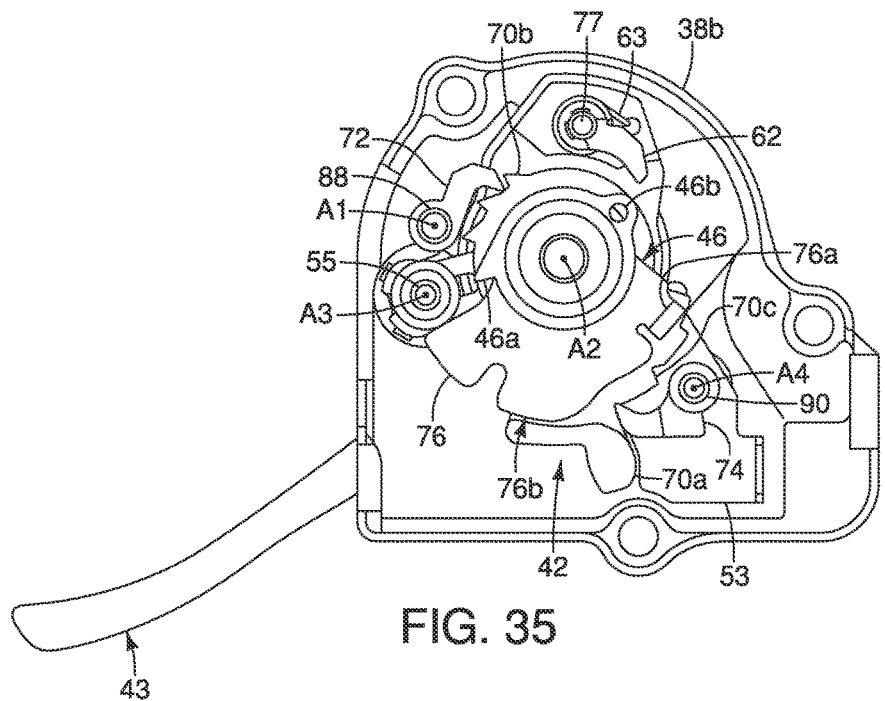
FIG. 35 is another top view, similar to FIG. 34, of selected internal parts of the second actuation unit of the bicycle control device, but with the second operating member removed to show the rest positions of the selected internal parts of the bicycle control device while the second operating member is in the rest position.

Referring to FIGS. 30 to 35, the bicycle control device 12 is illustrated in which the second actuation unit 42 performs a releasing operation of the second control cable 32 by pivoting the second operating member 45 from the rest (non-operated) position to the second operated position. FIGS. 30 and 31 show parts of the bicycle control device 12 that pertain the second actuation unit 42 in their rest positions. FIGS. 32 to 35 show the parts of the bicycle control device 12 be sequentially moved as the second operating member 45 is pivoted from the rest (non-operated) position to the second operated position and then back to the rest position. FIGS. 34 and 35 show the second take-up member 70 in the predetermined position corresponding to the fully released position.

Basically, during the releasing operation of the second control cable 32 by operating the second operating member 45, the second part 47 pivots on the third rotational axis A3. This pivoting of the second part 47 causes the first contact projection 47d of the second part 47 to apply a force on the contact projection 46a of the first part 46 and to rotate the first part 47 on the second rotational axis A2 in the take-up direction R1. As the the second part 47 pivots on the third rotational axis A3, the third contact projection 47f contacts the second releasing member 76 and rotates the second releasing member 76 in the releasing direction D2. Also this pivoting of the second part 47 causes the second contact projection 47e to pivot the second pulling member 72 away froth the pulling abutments 70b of the second take-up member 70 so that the second pulling member 72 will not interfere with the rotation of the second take-up member 70 in the releasing direction R2. As the second releasing member 76 rotates, the pawl of the second position maintaining member 74 slides along the cam surface 76b of the second releasing member 76 so that the the pawl of the second position maintaining member 74 disengages from the positioning abutments 70c of the second take-up member 70. Meanwhile, upon releasing the second operating member 45, the second operating member 45 returns to the rest position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device for operating a bicycle component, the bicycle control device comprising:
   a base member,
   an operating lever movably disposed with respect to the base member from a rest position to a first operated position and a second operated position that is opposite to the first operated position with respect to the rest position;
   a take-up member having a cable attachment structure that is movably disposed with respect to the base member in a take-up direction and a releasing direction that is opposite to the take-up direction; and
   a pulling pawl disposed on the operating lever to move the take-up member in the take-up direction in response to an operation of the operating lever toward the first operated position, the take-up member being configured to move in the releasing direction in response to an operation of the operating lever toward the second operated position, and the pulling pawl contacting with the take-up member while the operating lever is in the rest position.

2. The bicycle control device according to claim 1, wherein
   the operating lever moves the pulling pawl away from the take-up member in response to the operation of the operating lever toward the second operated position.

3. The bicycle control device according to claim 2, wherein
   the pulling lever is pivotally disposed on the operating lever about a first rotational axis.

4. The bicycle control device according to claim 1, wherein
   the take-up member is configured to rotate about a second rotational axis, and the operating lever rotates about the second rotational axis as the operating lever moves from the rest position toward the first operated position.

5. The bicycle control device according to claim 4, wherein
   the operating lever rotates about a third rotational axis as the operating lever moves from the rest position toward the second operated position, the third rotational axis being different from the second rotational axis.

6. The bicycle control device according to claim 5, wherein
   the pulling pawl is pivotally disposed on the operating lever about a first rotational axis.

7. The bicycle control device according to claim 6, wherein
   the first rotational axis is different from the second and third rotational axes.

8. The bicycle control device according to claim 7, wherein
   the first rotational axis rotates about the third rotational axis in response to the operation of the operating lever toward the second operated position.

9. The bicycle control device according to claim 5, wherein
   the operating lever includes an elongated slot through which the third rotational axis passes.

10. The bicycle control device according to claim 9, wherein
    the third rotational axis relatively moves along the elongated slot while the operating lever is operated from the rest position toward the first operated position.

11. The bicycle control device according to claim 5, wherein
    the operating lever includes a first part rotatably disposed with respect to the base member about the second rotational axis and a second part rotatably disposed with respect to the base member about the third rotational axis.

12. The bicycle control device according to claim 11, wherein
    the first part and the second part rotate together about the second rotational axis in response to the operation of the operating lever toward the first operated position.

13. The bicycle control device according to claim 12, wherein
the first part rotates about the second rotational axis and the second part rotates about the third rotational axis in response to the operation of the operating lever toward the second operated position.

14. The bicycle control device according to claim 11, wherein
the second part includes a first axle pivotally supporting the pulling pawl on the second part about the first rotational axis.

15. The bicycle control device according to claim 1, further comprising:
a position maintaining pawl movably disposed with respect to the base member to move between a holding position that holds the take-up member in one of a plurality of predetermined positions and a releasing position that releases the take-up member for rotational movement.

16. The bicycle control device according to claim 15, further comprising
a releasing member configured to move the position maintaining pawl to the releasing position in response to the operation of the operating lever toward the second operated position.

17. The bicycle control device according to claim 16, wherein
the position maintaining pawl is pivotally disposed relative to the base member about a fourth rotational axis.

18. A bicycle control device for operating a bicycle component, the bicycle control device comprising:
a base member,
an operating lever movably disposed with respect to the base member from a rest position to a first operated position and a second operated position that is opposite to the first operated position with respect to the rest position;
a take-up member having a cable attachment structure that is movably disposed with respect to the base member in a take-up direction and a releasing direction that is opposite to the take-up direction; and
a pulling pawl disposed on the operating lever to move the take-up member in the take-up direction in response to an operation of the operating lever toward the first operated position, the pulling pawl contacting the take-up member while the operating lever is in the rest position,
the operating lever being configured to move the pulling pawl away from the take-up member in response to the operation of the operating lever toward the second operated position.

19. A bicycle control device comprising:
a base member;
a first actuation unit including:
a first take-up member movably disposed on the base member for pulling and releasing a first control cable coupled to a first bicycle component;
a first position maintaining pawl movably disposed with respect to the base member to selectively maintain the first take-up member in one of a plurality of predetermined positions, and
a first operating lever movably disposed with respect to the base member to change a current position of the first take-up member for pulling and releasing the first control cable; and
a second actuation unit including:
a second take-up member movably disposed on the base member for pulling and releasing a second control cable coupled to a second bicycle component;
a second position maintaining pawl movably disposed with respect to the base member to selectively maintain the second take-up member in one of a plurality of predetermined positions, and
a second operating lever movably disposed with respect to the base member to change a current position of the second take-up member for pulling and releasing the second control cable, the second operating lever being movable with respect to the base member in a first operating direction such that the second take-up member pulls the second control cable and is movable with respect to the base member in a second operating direction that is different from the first operating direction such that the second take-up member releases the second control cable.

20. The bicycle control device according to claim 19, wherein
the base member includes a housing, the first take-up member and the second take-up member being disposed in the housing.

21. The bicycle control device according to claim 19, wherein
the first take-up member and the second take-up member are configured to coaxially rotatable with respect to the base member about a rotational axis.

22. The bicycle control device according to claim 19, wherein
the first operating lever is movable with respect to the base member in a third operating direction such that the first take-up member selectively pulls and releases the first control cable.

23. The bicycle control device according to claim 19, wherein
the second take-up member has more than or equal to three predetermined positions and the first take-up member has only two predetermined positions.

24. The bicycle control device according to claim 19, wherein
the second bicycle component is one of a bicycle suspension and a height adjustable seatpost, and the first bicycle component is a bicycle gear transmission.

* * * * *